United States Patent
Wahl

(10) Patent No.: US 7,912,965 B2
(45) Date of Patent: Mar. 22, 2011

(54) SYSTEM AND METHOD FOR ANOMALOUS DIRECTORY CLIENT ACTIVITY DETECTION

(75) Inventor: Mark Frederick Wahl, Austin, TX (US)

(73) Assignee: Informed Control Inc., Austin, TX (US)

( * ) Notice: Subject to any disclaimer, the term of this patent is extended or adjusted under 35 U.S.C. 154(b) by 214 days.

(21) Appl. No.: 12/287,632

(22) Filed: Oct. 11, 2008

(65) Prior Publication Data

US 2009/0100130 A1 Apr. 16, 2009

Related U.S. Application Data

(60) Provisional application No. 60/998,720, filed on Oct. 12, 2007.

(51) Int. Cl.
*G06F 15/16* (2006.01)
*G06F 15/173* (2006.01)
*G06F 17/30* (2006.01)

(52) U.S. Cl. .......................... 709/227; 709/224; 707/783

(58) Field of Classification Search .......... 709/201–203, 709/223–227; 707/780–786
See application file for complete search history.

(56) References Cited

U.S. PATENT DOCUMENTS

| | | | |
|---|---|---|---|
| 6,665,674 B1 * | 12/2003 | Buchanan et al. ..................... 1/1 |
| 7,278,023 B1 * | 10/2007 | Siegel et al. ................... 713/183 |
| 7,448,084 B1 * | 11/2008 | Apap et al. ....................... 726/24 |
| 7,673,147 B2 * | 3/2010 | Moghe et al. ................. 713/182 |
| 2002/0035698 A1 * | 3/2002 | Malan et al. ................... 713/201 |
| 2003/0005326 A1 * | 1/2003 | Flemming ..................... 713/201 |

OTHER PUBLICATIONS

Sun Microsystems Inc., "Sun ONE Directory Server 5.2 Reference Manual", Chapter 8, http://docs.sun.com/source/816-6699-10/logfiles.html, Apr. 2006.

* cited by examiner

*Primary Examiner* — Yasin Barqadle

(57) ABSTRACT

An information processing system for a computing network in which the access log of a directory server is analyzed to detect anomalous client access requests.

4 Claims, 36 Drawing Sheets

SYSTEM AND METHOD FOR ANOMALOUS DIRECTORY CLIENT ACTIVITY DETECTION

CROSS-REFERENCE TO RELATED APPLICATIONS

This application claims the benefit of PPA Ser. No. 60/998,720 "System and Method for Anomalous Directory Client Activity Detection" filed Oct. 12, 2007 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to security in computer networks.

2. Prior Art

A typical identity management deployment for an organization will incorporate a directory service. In a typical directory service, one or more server computers host instances of directory server software. These directory servers implement the server side of a directory access protocol, such as the X.500 Directory Access Protocol (DAP), as defined in the document ITU-T Rec. X.519 "Information technology—Open Systems Interconnection—The Directory: Protocol specifications", or the Lightweight Directory Access Protocol (LDAP), as defined in the document "Lightweight Directory Access Protocol (v3)", by M. Wahl et al of December 1997. The client side of the directory access protocol is implemented in other components of the identity management deployment, such as an identity manager or access manager.

A directory access protocol follows a request-response model of interaction, in which the client establishes a connection to a directory server, and over that connection, sends one or more requests. The directory server processes those requests and sends responses over that connection. The types of requests in a directory access protocol include:
 the bind request, in which the client sends its authentication information to the server,
 the search request, in which the client requests one or more entries in the server's directory information tree be returned,
 the modify request, in which the client requests that the set of attributes be changed in an entry in the server's directory information tree, and
the delete request, in which the client requests that an entry be removed from the server's directory information tree.

A directory server typically generates an access log in a text file or in a relational database. A typical directory server adds a log record to the access log for each of the following categories of events:
 an incoming connection from a directory client,
 a connection from a directory client is closed,
 a request is received on a connection from a directory client, and
 a response is sent on a connection to a directory client.

One prior art format for a directory server log is specified in chapter 8 (Access Logs and Connection Codes) of the document "Sun ONE Directory Server 5.2 Reference Manual" published by Sun Microsystems Inc. in 2003.

A directory-enabled access control system comprises a set of middleware components which rely upon a directory server to maintain information about the users in an enterprise, in particular, each user's authentication credentials and access rights.

Typically, an implementation of a directory-enabled access control system in the prior art will, when a user attempts to authenticate by providing their name and credential, send a search request to a directory server to locate the entry for that user. If an entry is found for that user, then the implementation either may read an attribute containing a credential from the returned directory entry and compare that credential with a credential presented by the user, or the implementation may send a bind request to the directory server to perform the comparison, in which the bind request comprises the distinguished name of the entry and the credential supplied by the user.

SUMMARY

This invention defines a system and a method to analyze the access log of a directory server in order to detect anomalous client access requests. A report of these requests is provided to an administrator.

DRAWINGS

Figures

FIG. 7A, FIG. 7B, FIG. 7C, FIG. 7D, FIG. 7E, FIG. 7F, FIG. 7G, FIG. 7H and FIG. 7I are a flowchart illustrating the primary control path of the analysis phase of the analysis server component.

Figure 1:
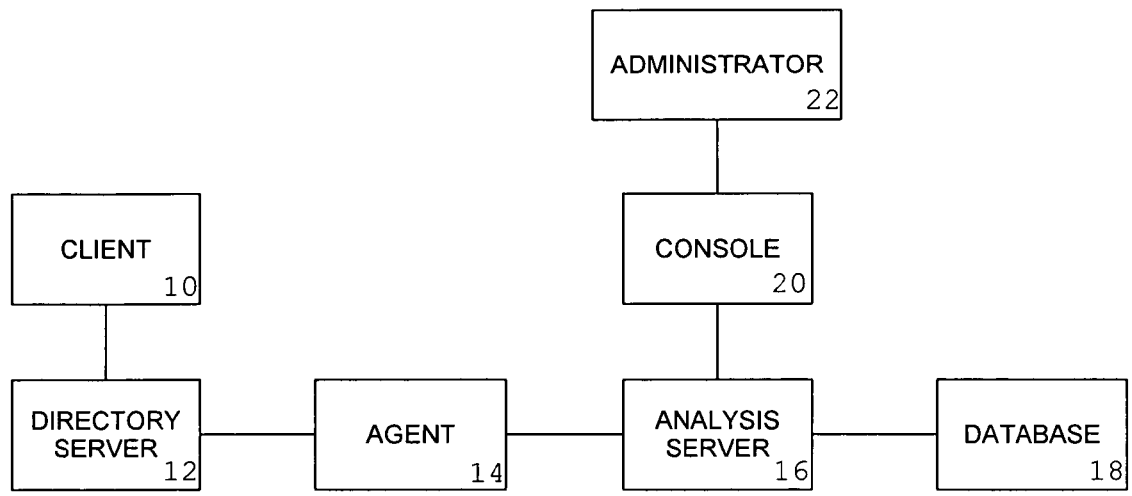
FIG. 1 is a diagram that illustrates the components of the system for anomalous client activity detection in directory access logs.

REFERENCE NUMERALS 10 client component
12 directory server component
14 agent component
16 analysis server component
18 database component
20 console component
22 administrator
68 data model class Com_InformedControl_General_NetworkObject
70 data model class Com_InformedControl_General_NetworkAddress
72 data model class Com_InformedControl_General_NetworkInterface
74 data model class Org_DMTF_CIM_System
76 data model class Com_InformedControl_Identity_DirectoryClient
78 data model class Com_InformedControl_Identity_DirectoryClientProfile
80 data model class Com_InformedControl_Identity_DirectoryClientProfileTemplate
82 data model class Com_InformedControl_Identity_DirectoryAccessCategory
84 data model class Com_InformedControl_Identity_DirectoryServerSet
86 data model class Com_InformedControl_Identity_DirectoryServer
88 data model class Com_InformedControl_Identity_DirectorySubtree
300 Epoch set
302 Epoch
304 Directory Server
306 Constraint
308 Connection
310 Anomaly
312 Unmet Anomaly
314 Bind Anomaly
316 Error Anomaly
318 Dir Access Client Profile
320 System
322 Network Object
324 Directory Client
326 Directory Client Profile
328 Dir Constraint Conn
330 Dir Constraint Bind
332 Dir Constraint Op
334 Operation
336 Operation Set
338 Directory Subtree
1100 Network switch
1102 Middleware server computer
1104 Directory server computer
1106 Administrator workstation computer
1108 Database server computer
1110 Analysis server computer
1200 Computer
1202 CPU
1204 Hard disk interface
1206 System bus
1208 BIOS ROM
1210 Hard disk
1212 Operating system software on hard disk
1214 Application software on hard disk
1216 RAM
1218 Operating system software in memory
1220 Application software in memory
1222 Network interface
1224 LAN switch
1400 Computer
1402 CPU
1404 Video interface
1406 System bus
1408 USB interface
1410 Hard disk interface
1412 BIOS ROM
1414 Hard disk
1416 Operating system software on disk
1418 Application software on disk
1420 Network interface
1422 RAM
1424 Operating system software in memory
1426 Application software in memory
1428 Monitor
1430 Keyboard
1432 Mouse
1434 LAN switch

DETAILED DESCRIPTION

This invention comprises the following components:
a client component (10),
a directory server component (12),
an agent component (14),
an analysis server component (16),
a database component (18), and
a console component (20).

The client component (10) is a software application that sends requests to a directory server component (12) using a directory access protocol, such as LDAP.

The directory server component (12) is a software application that implements the server side of a directory access protocol, such as LDAP. The directory server relies upon a database to provide a directory information tree via the directory access protocol to a client component (10). The directory server component generates an access log, typically in a file or in a table in a relational database.

Figure 2A:
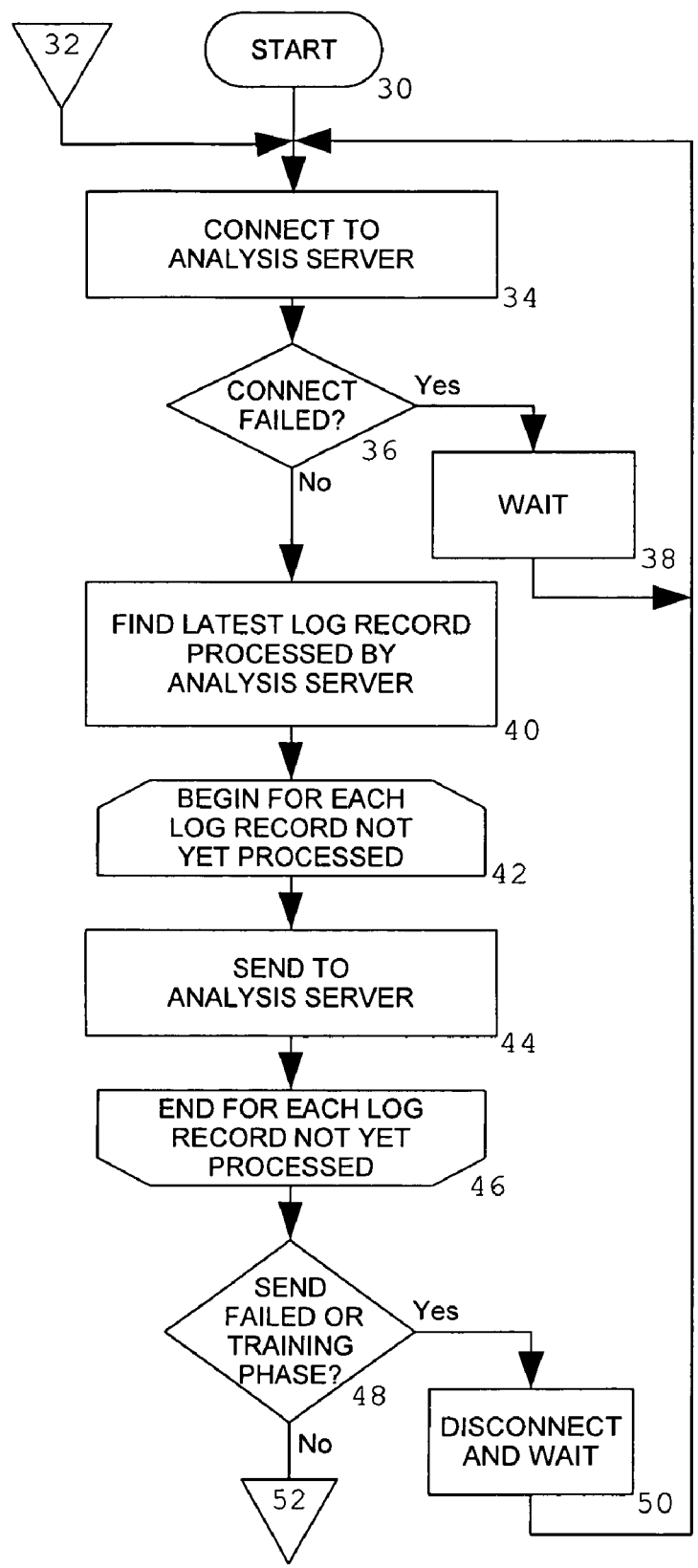
FIG. 2A and FIG. 2B are a flowchart illustrating the behavior of a log parsing agent component.
Figure 2B:
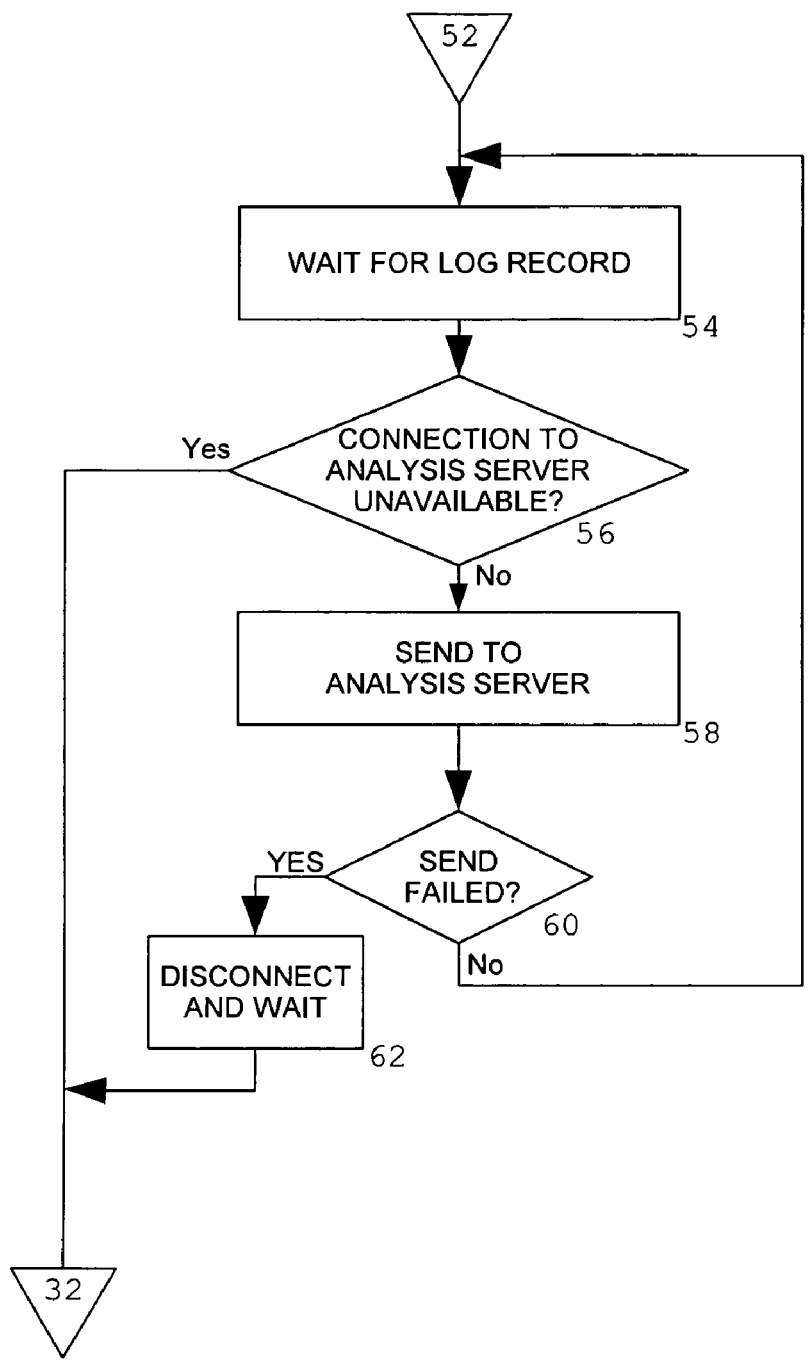
Figure 3:
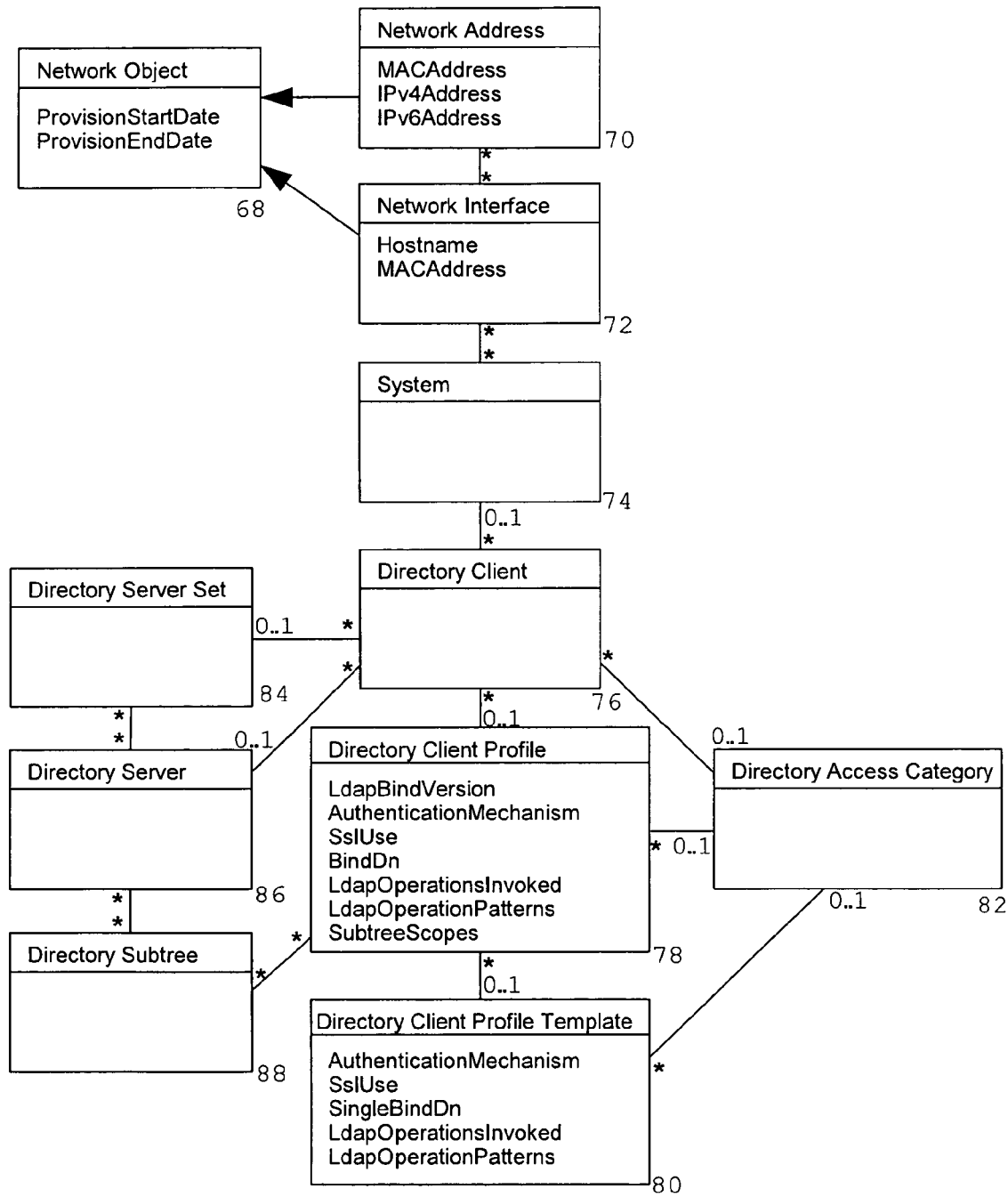
FIG. 3 is a diagram illustrating the data model of the database component.
Figure 4A:
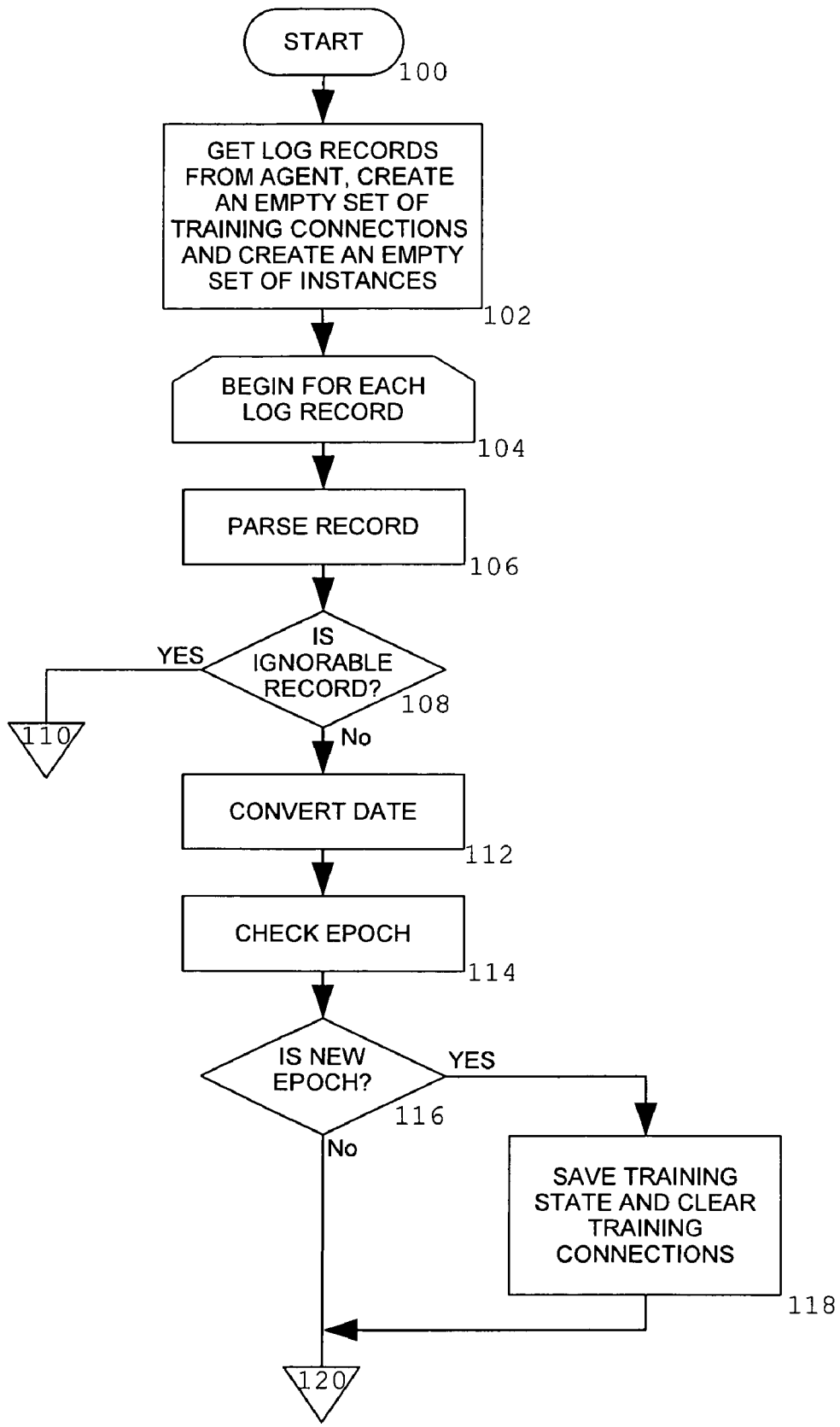
FIG. 4A, FIG. 4B, FIG. 4C and FIG. 4D are a flowchart illustrating the primary control path of the training phase of the analysis server component.
Figure 4B:
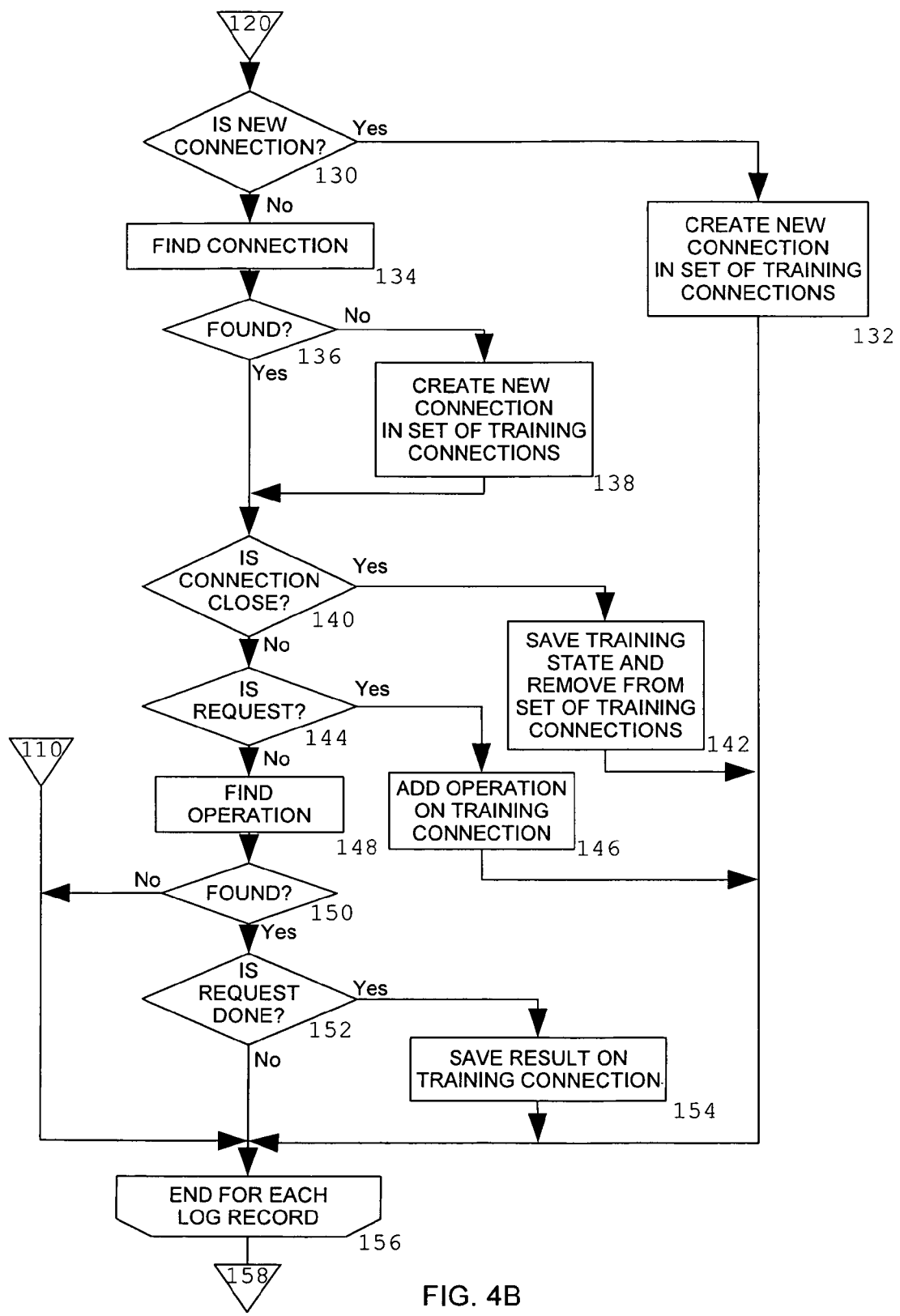
Figure 4C:
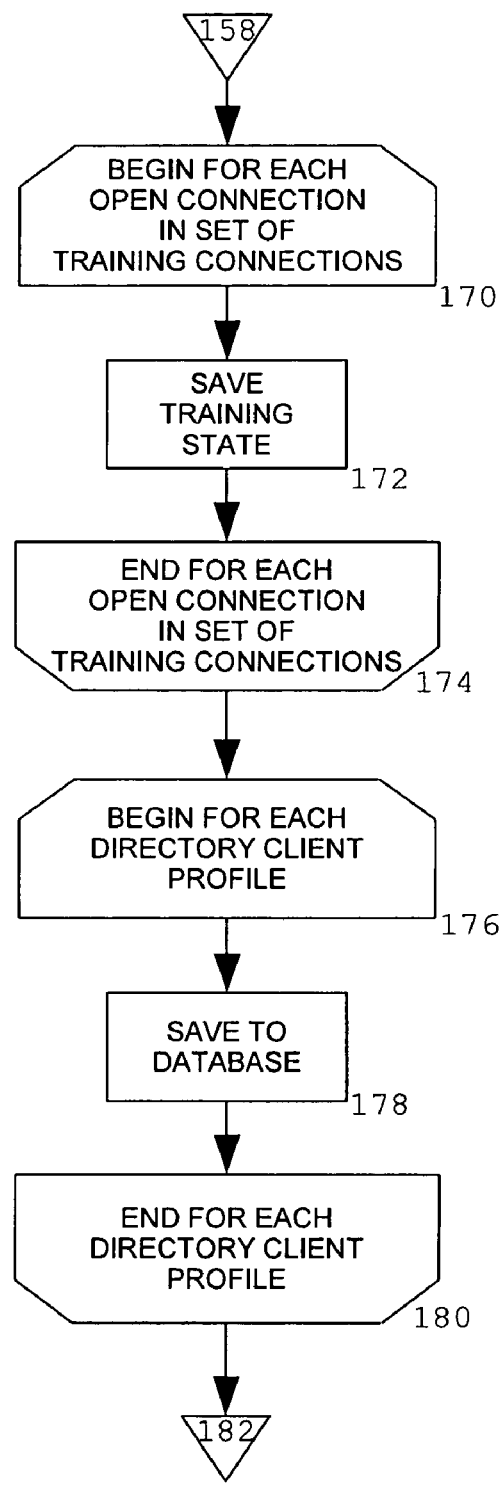
Figure 4D:
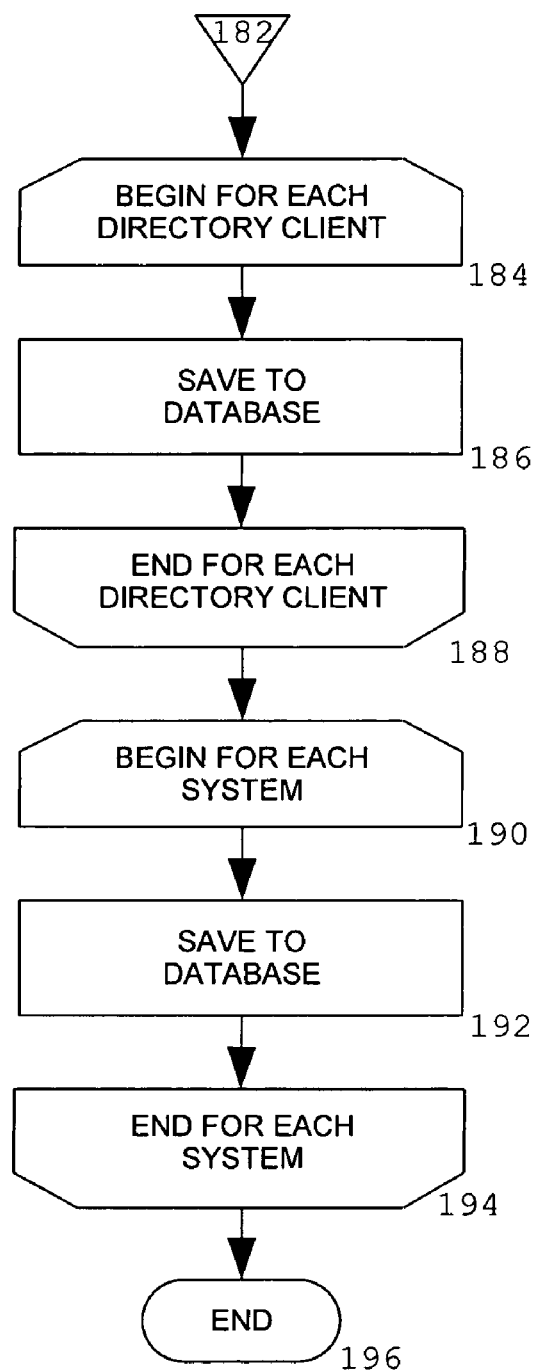
Figure 5A:
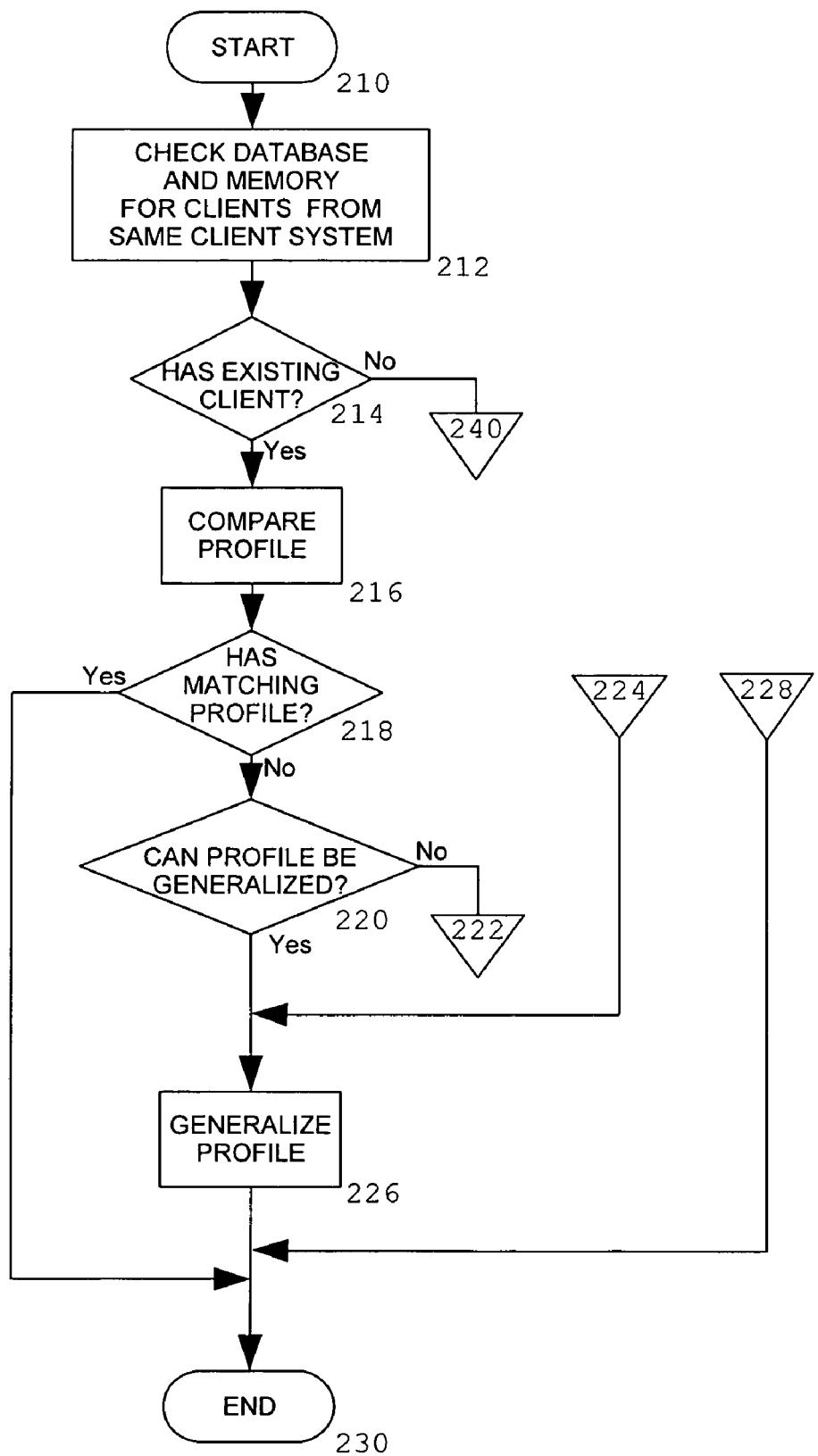
FIG. 5A, FIG. 5B, FIG. 5C and FIG. 5D are a flowchart illustrating the "save training state" subroutine of the analysis server component.
Figure 5B:
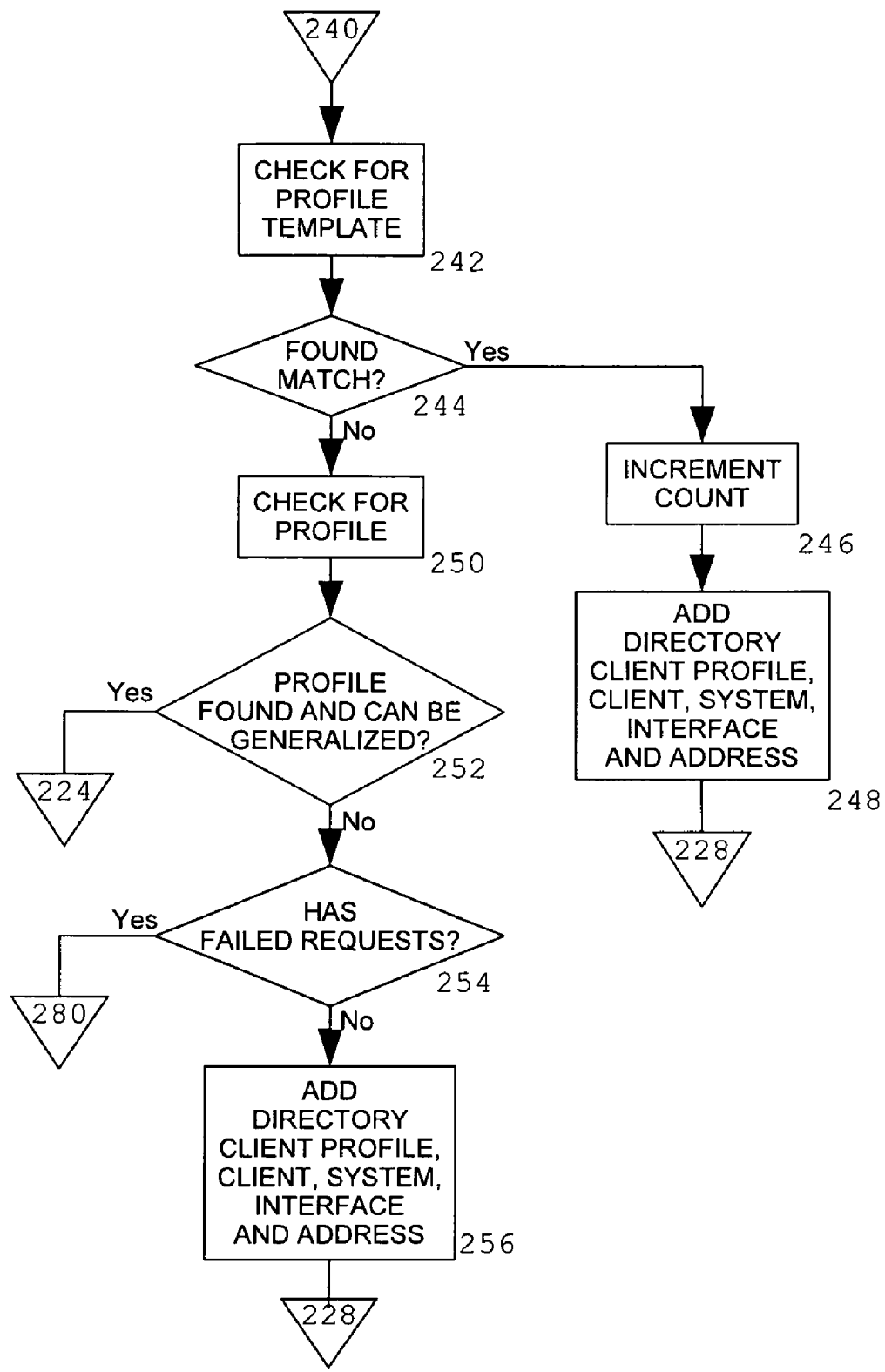
Figure 5C:
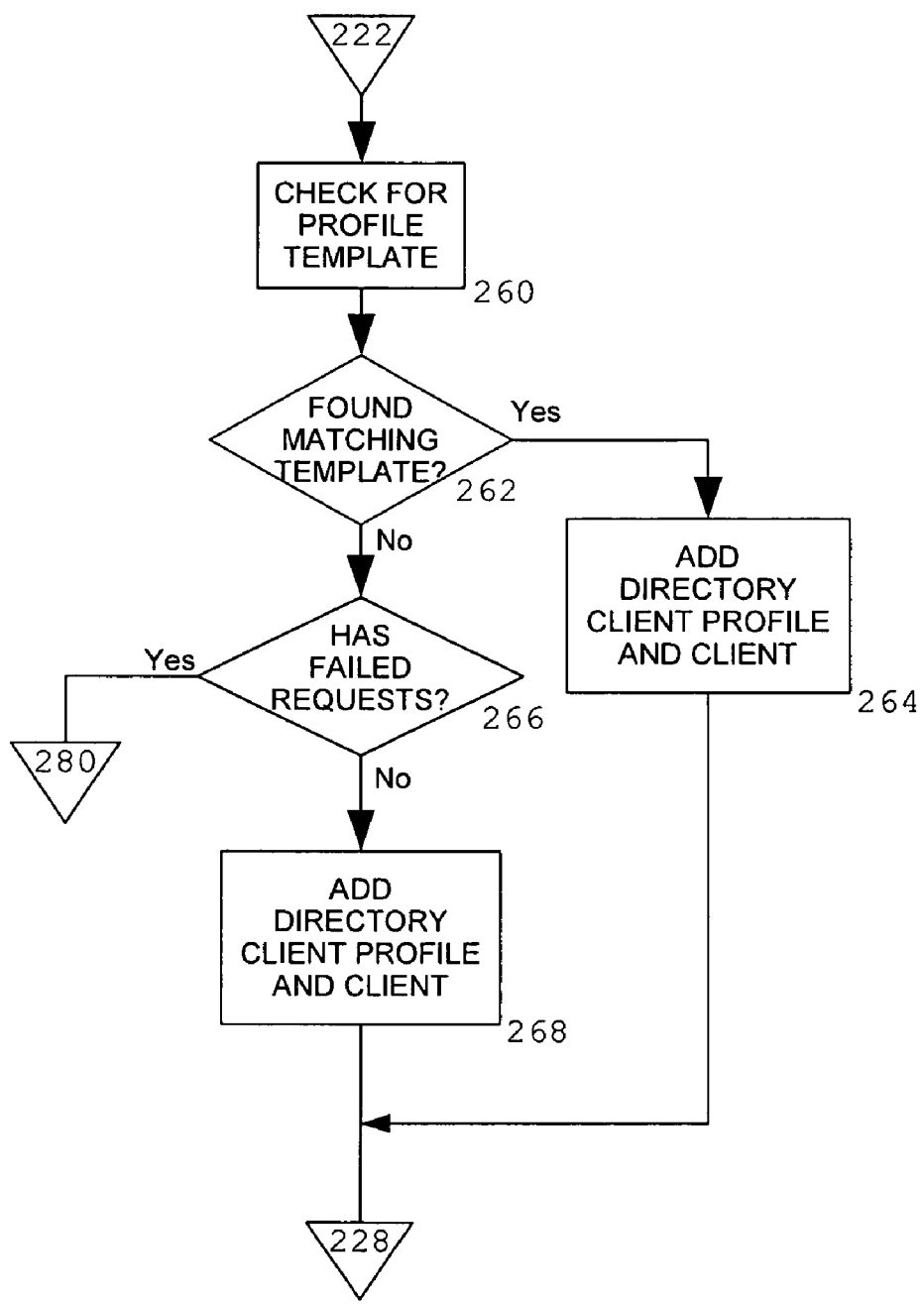
Figure 5D:
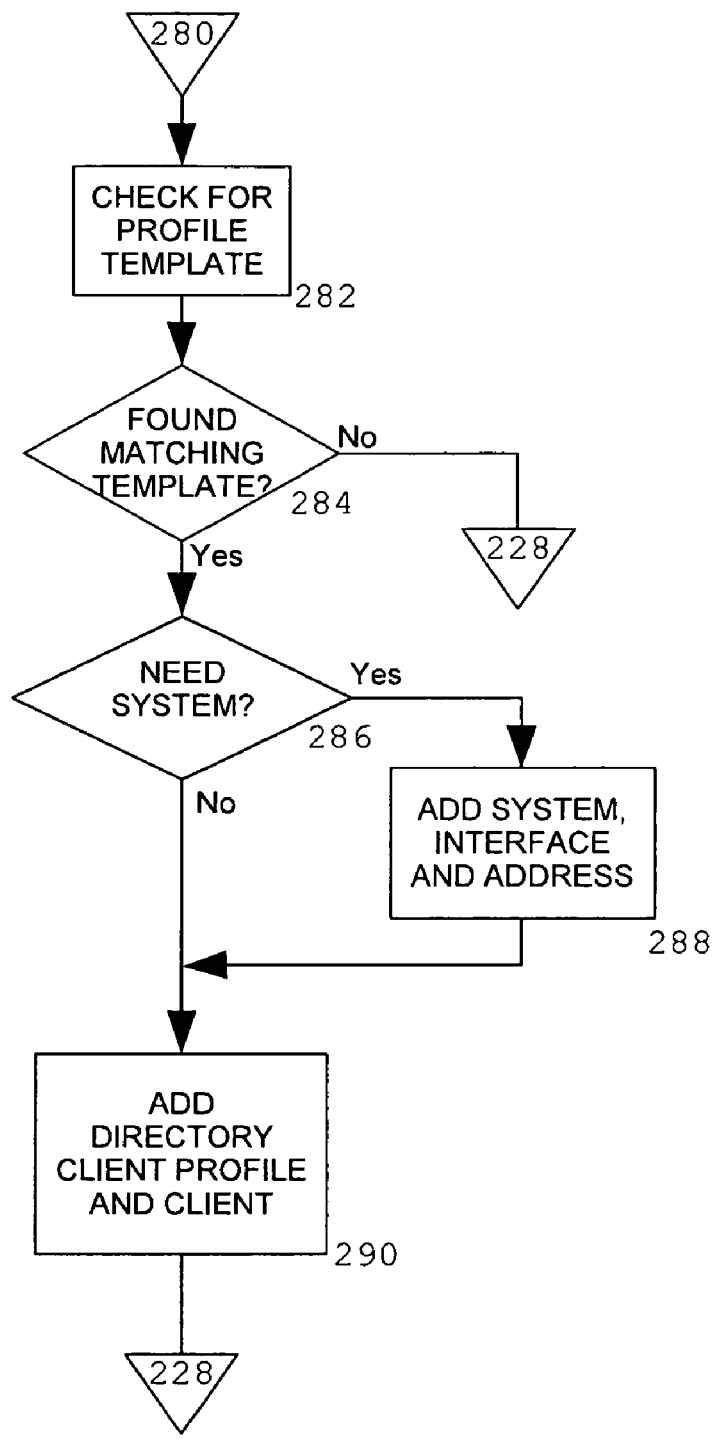
Figure 6:
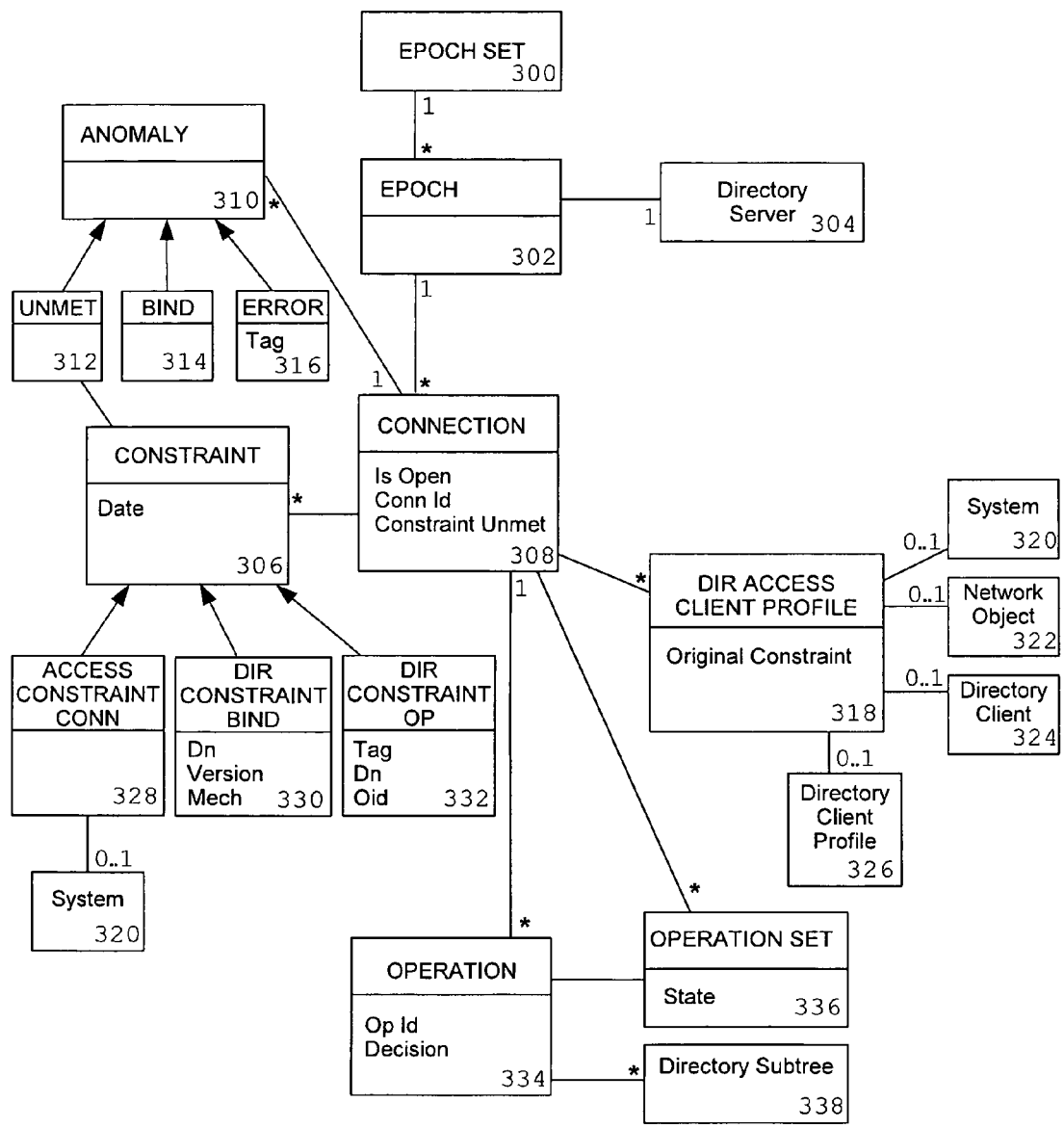
FIG. 6 is a diagram illustrating the in-memory data structures of the analysis server component.
Figure 7A:
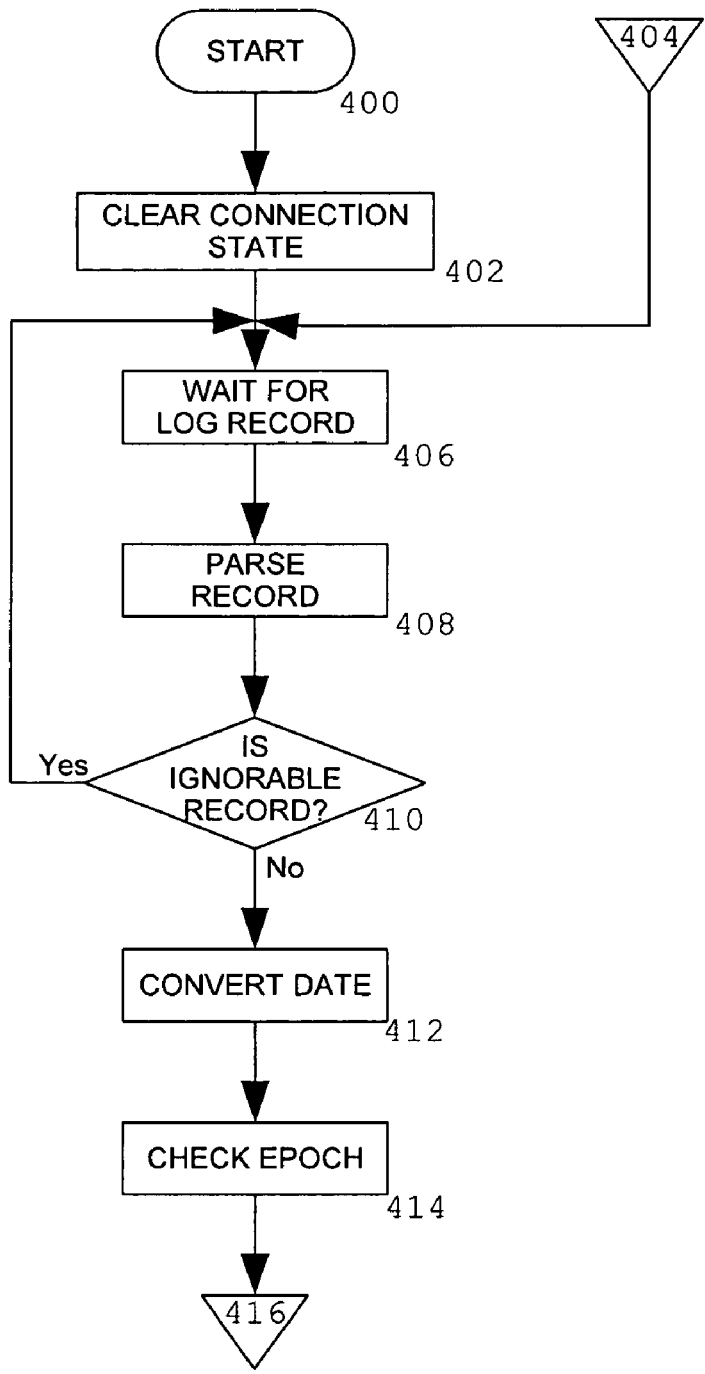
Figure 7B:
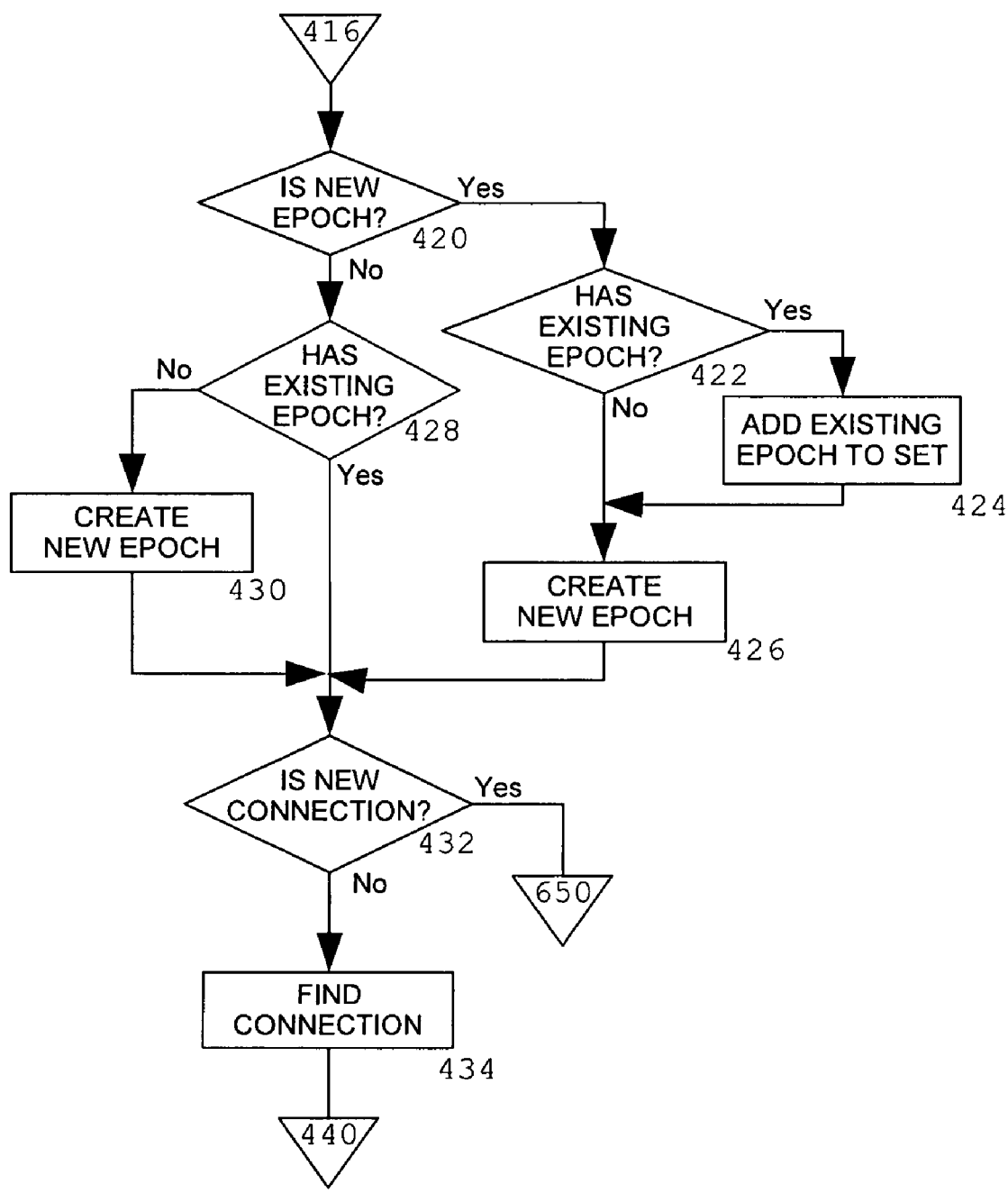
Figure 7C:
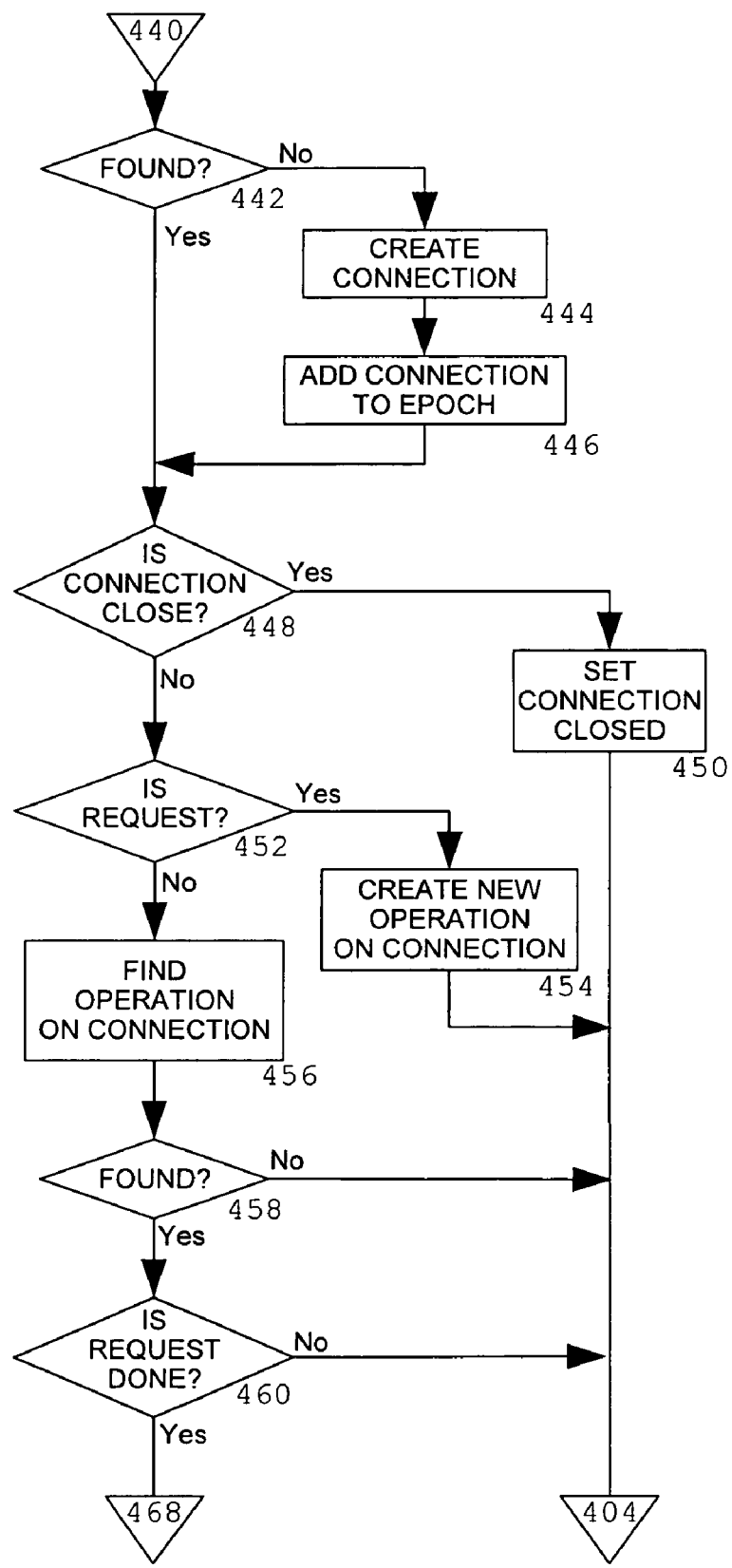
Figure 7D:
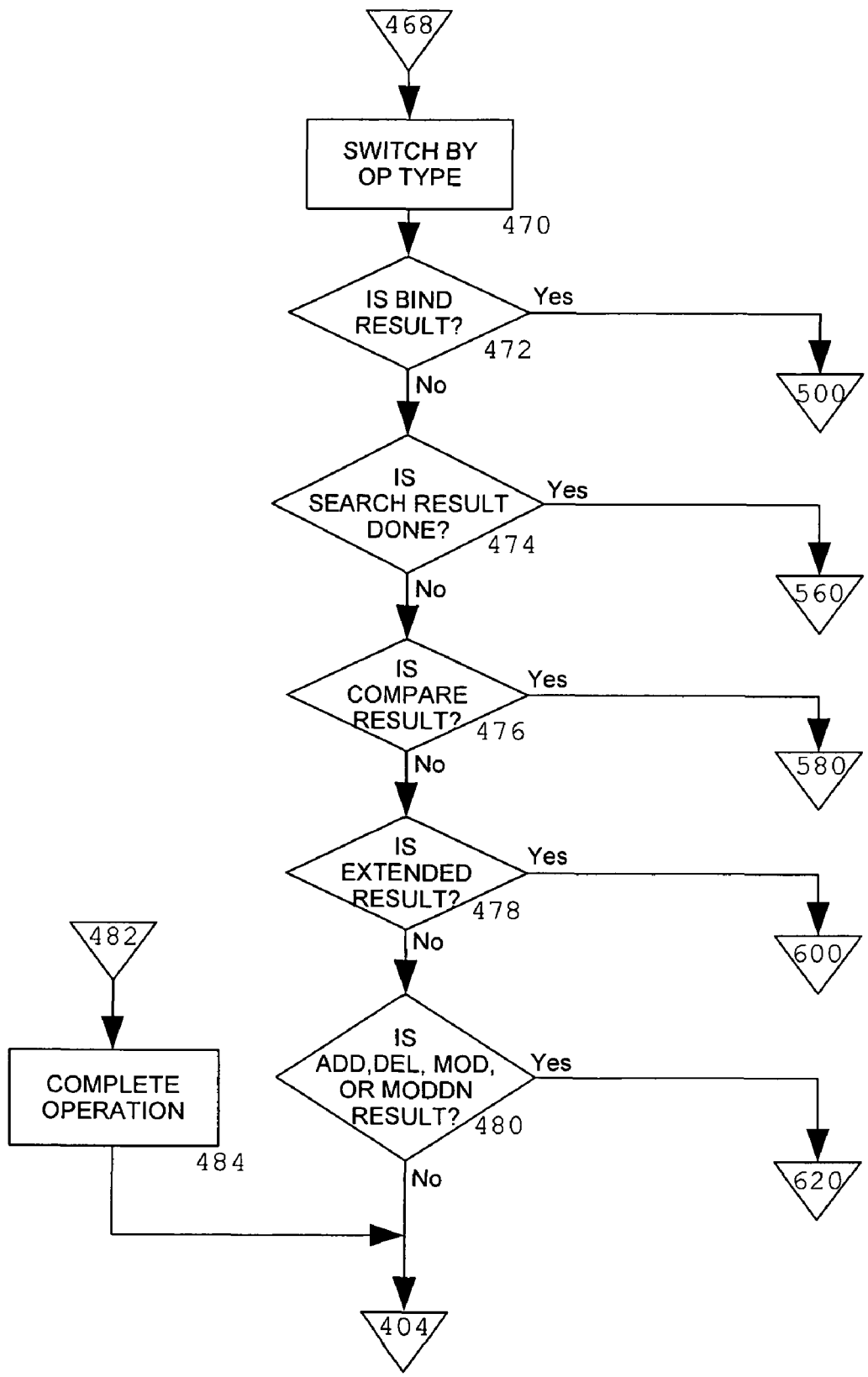
Figure 7E:
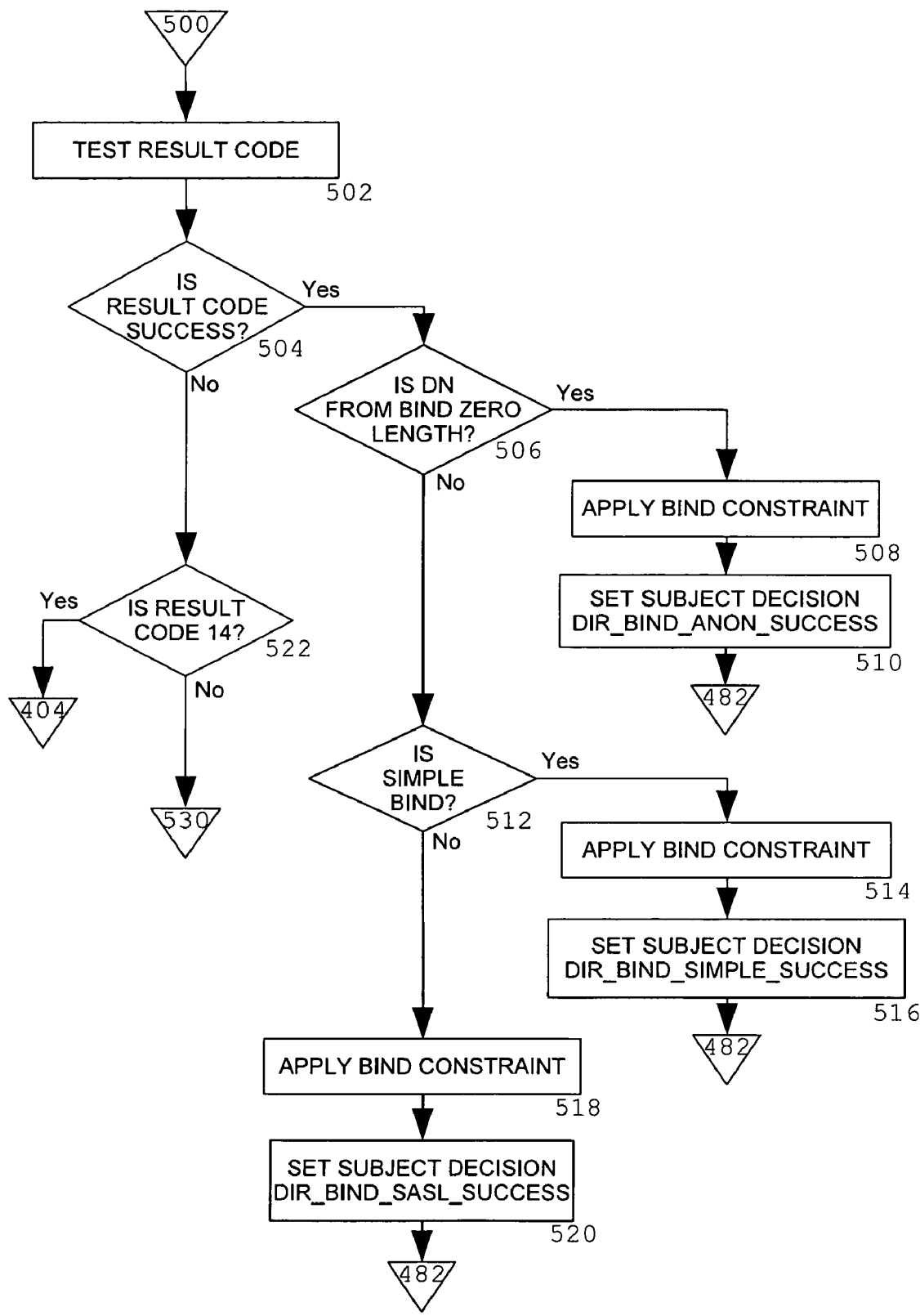
Figure 7F:
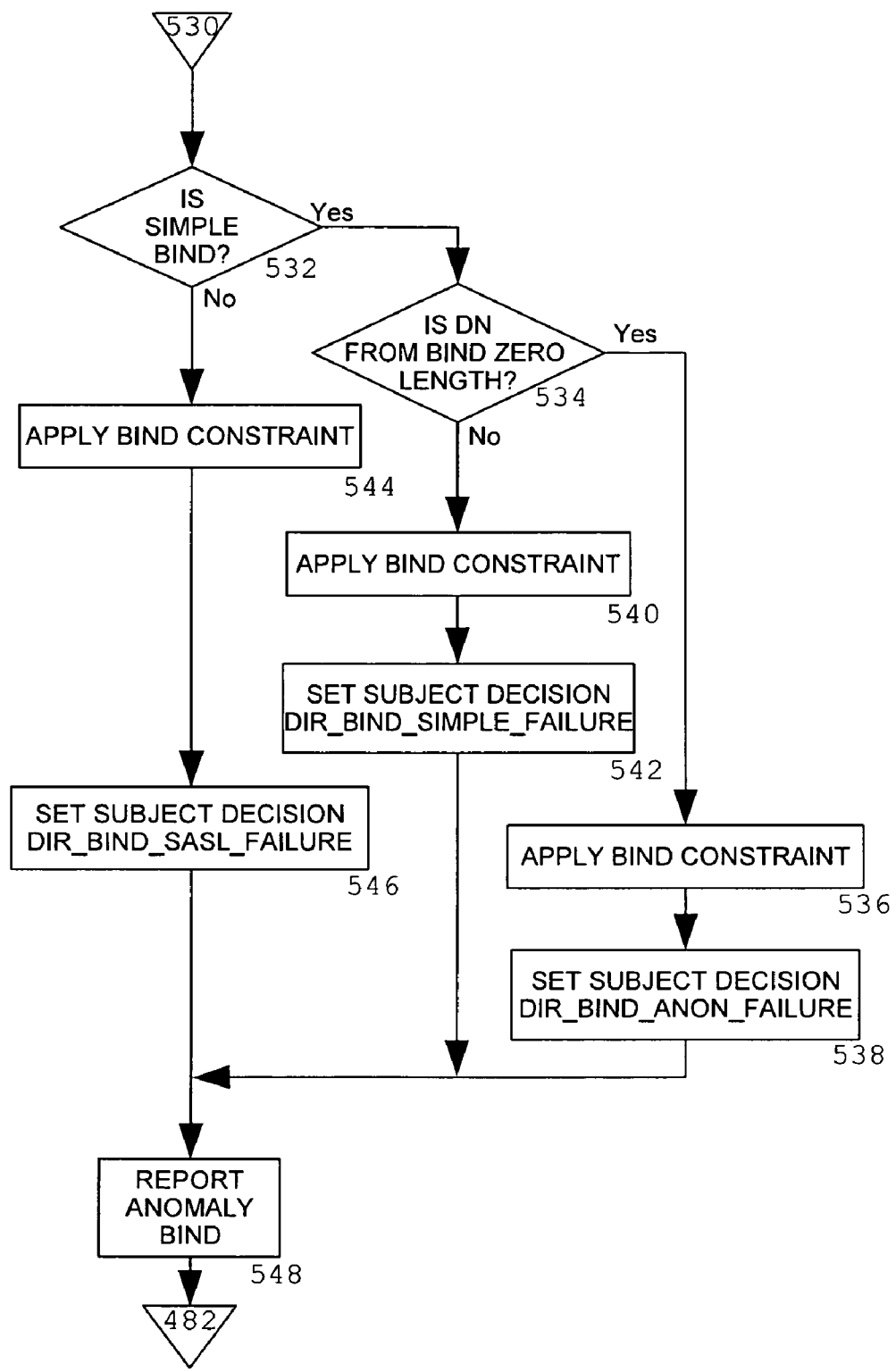
Figure 7G:
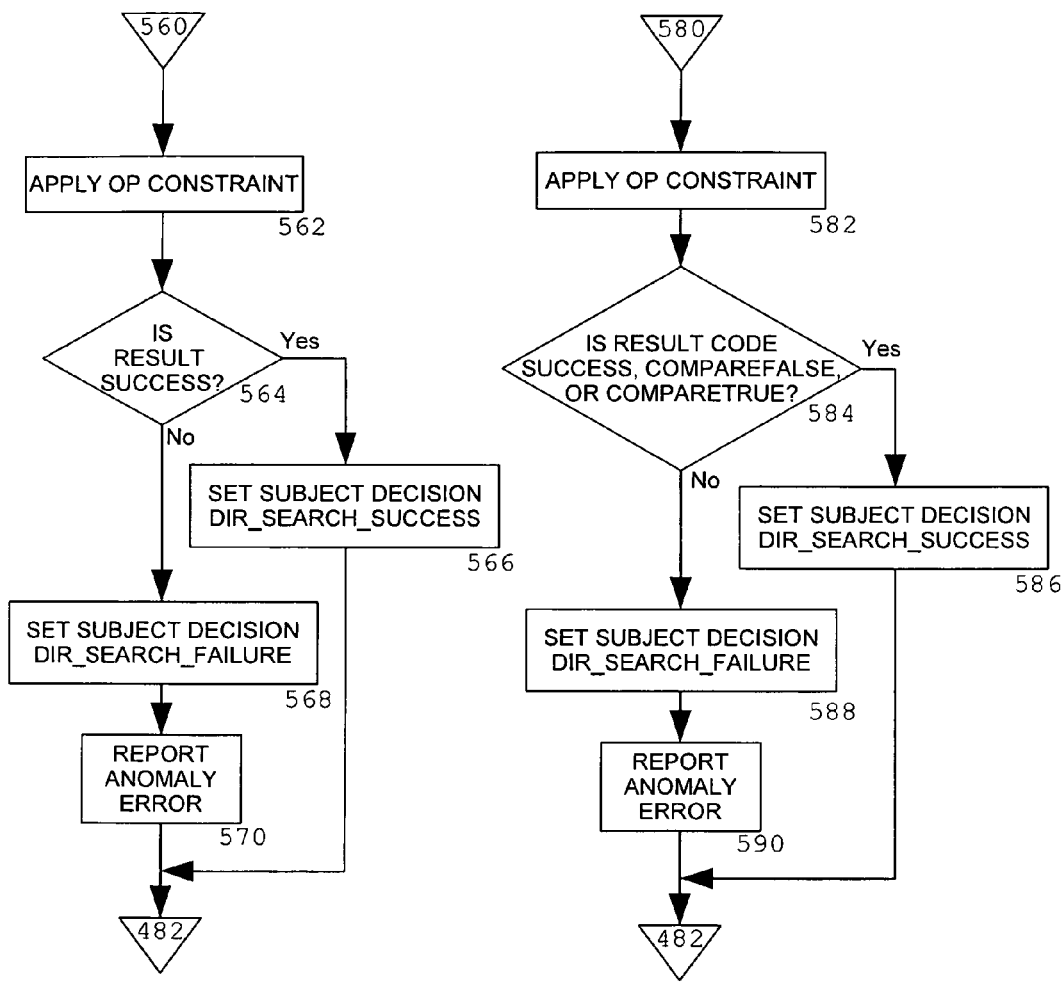
Figure 7H:
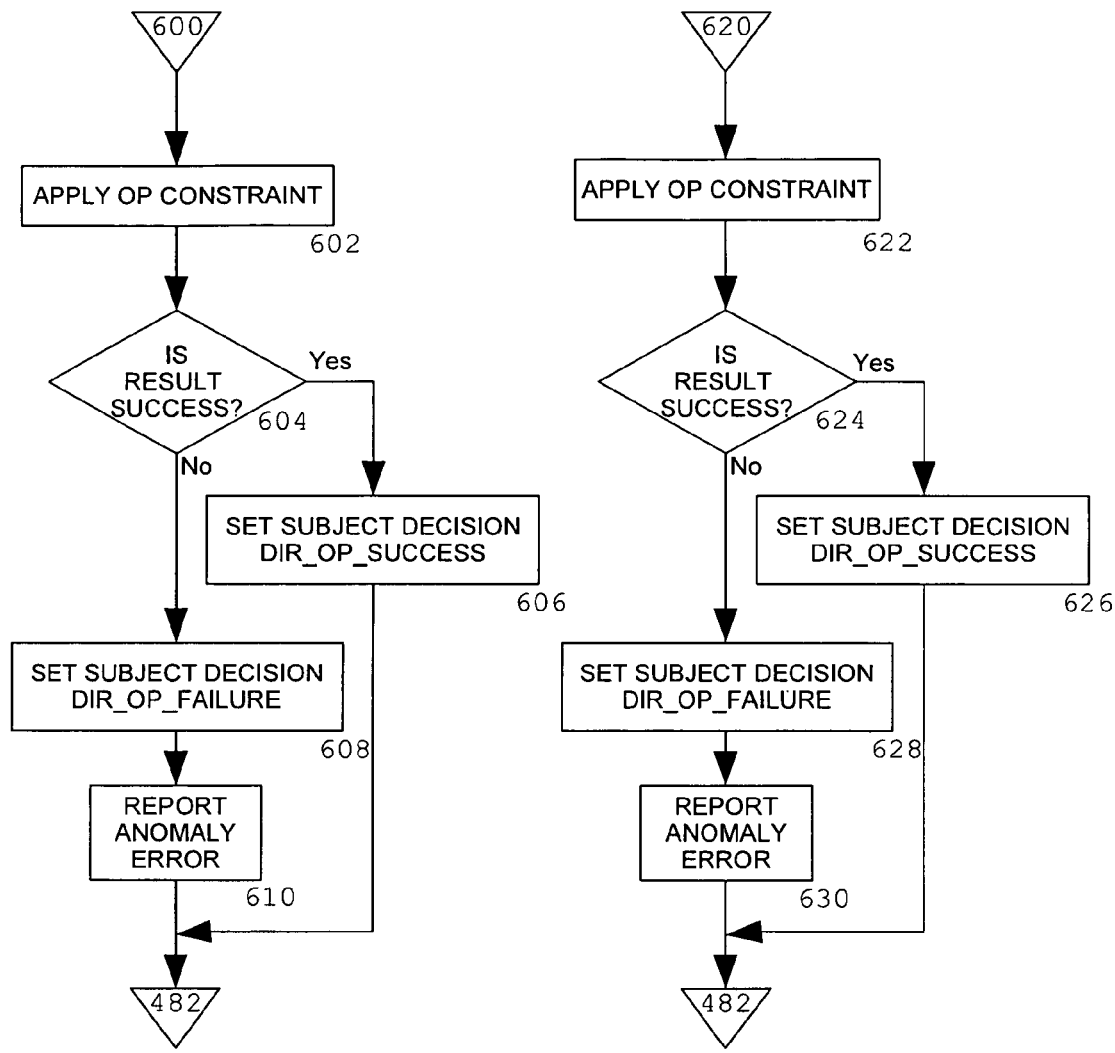
Figure 71:
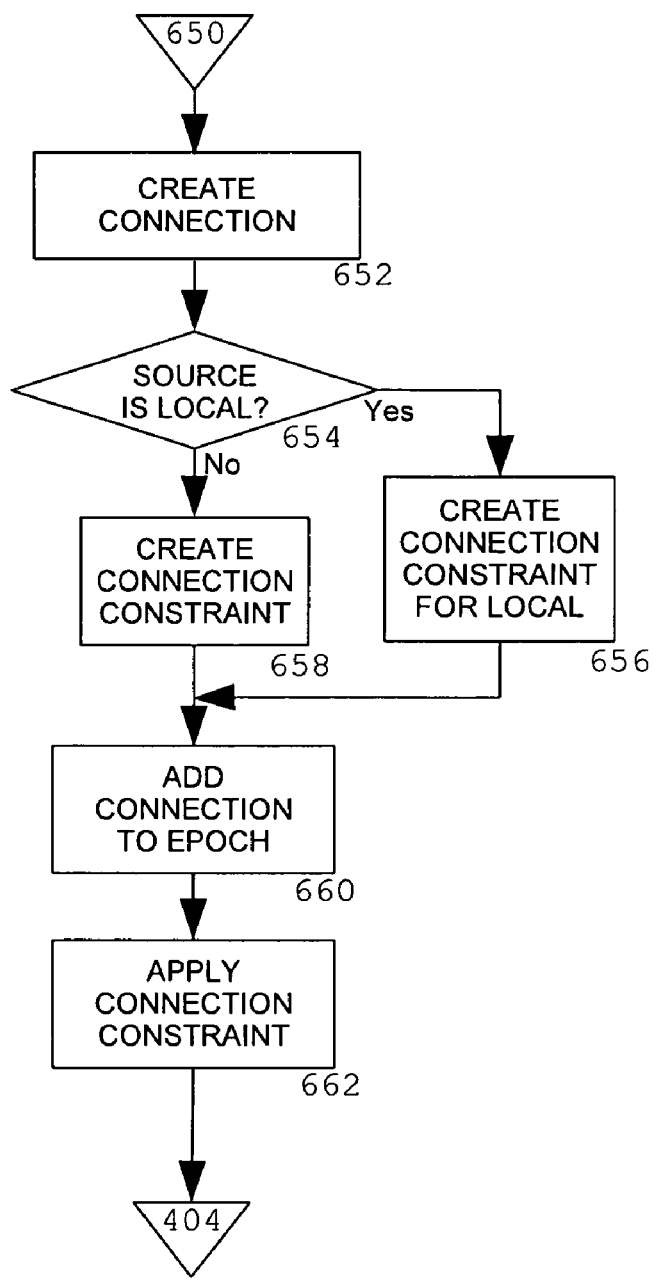
Figure 8A:
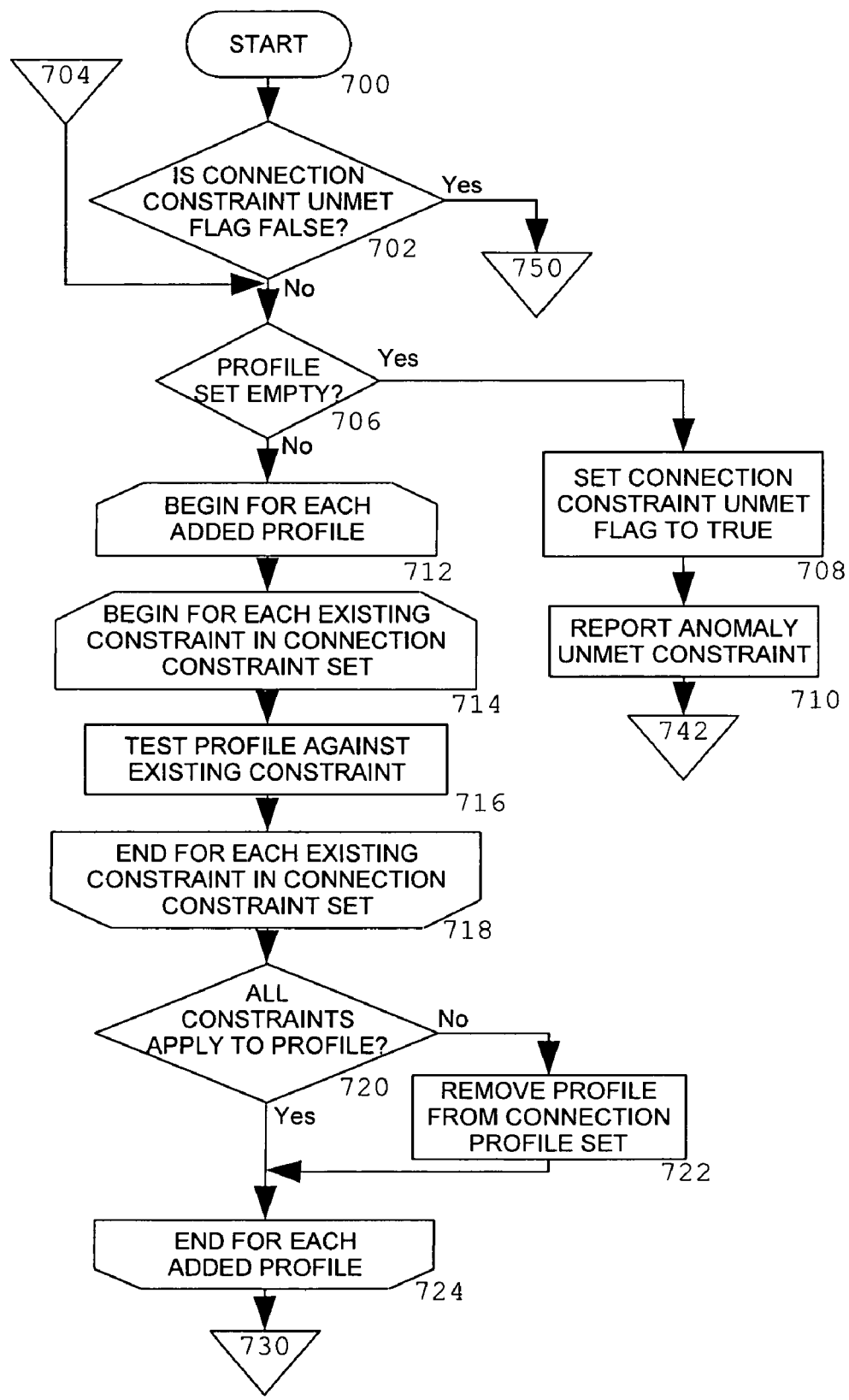
FIG. 8A, FIG. 8B, FIG. 8C, FIG. 8D, FIG. 8E, FIG. 8F and FIG. 8G are a flowchart illustrating the "apply constraint" subroutine of the analysis server component.
Figure 8B:
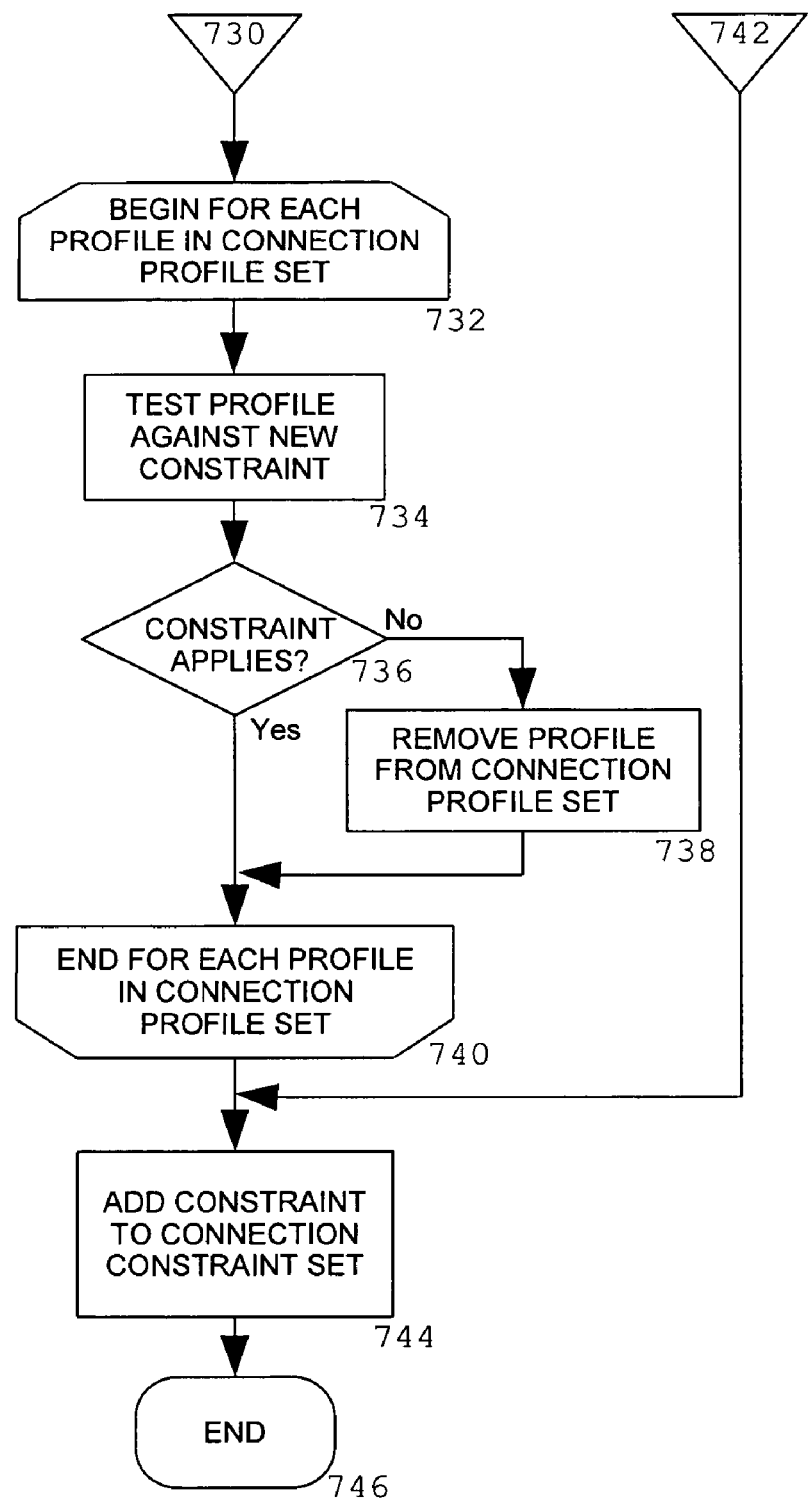
Figure 8C:
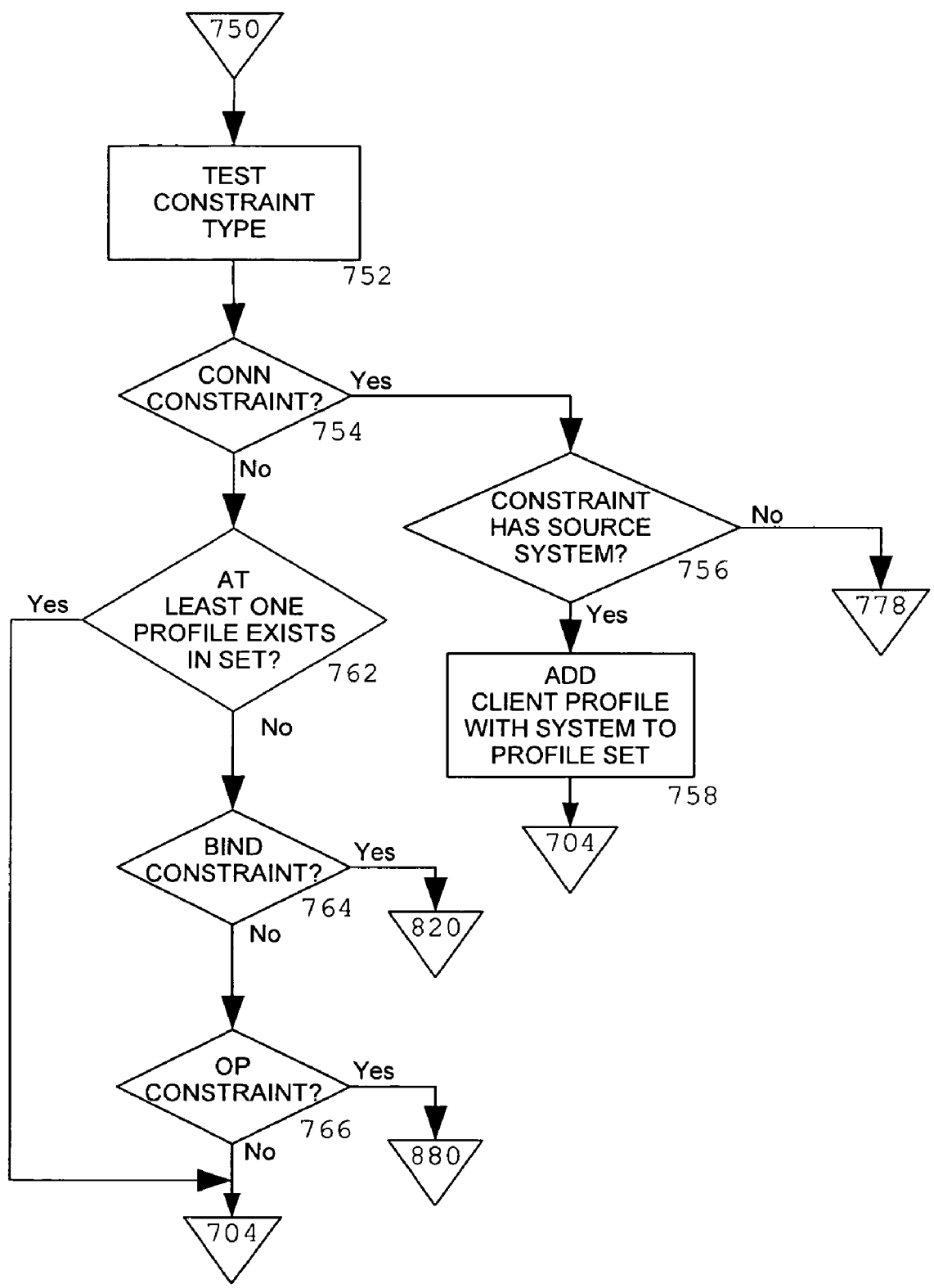
Figure 8D:
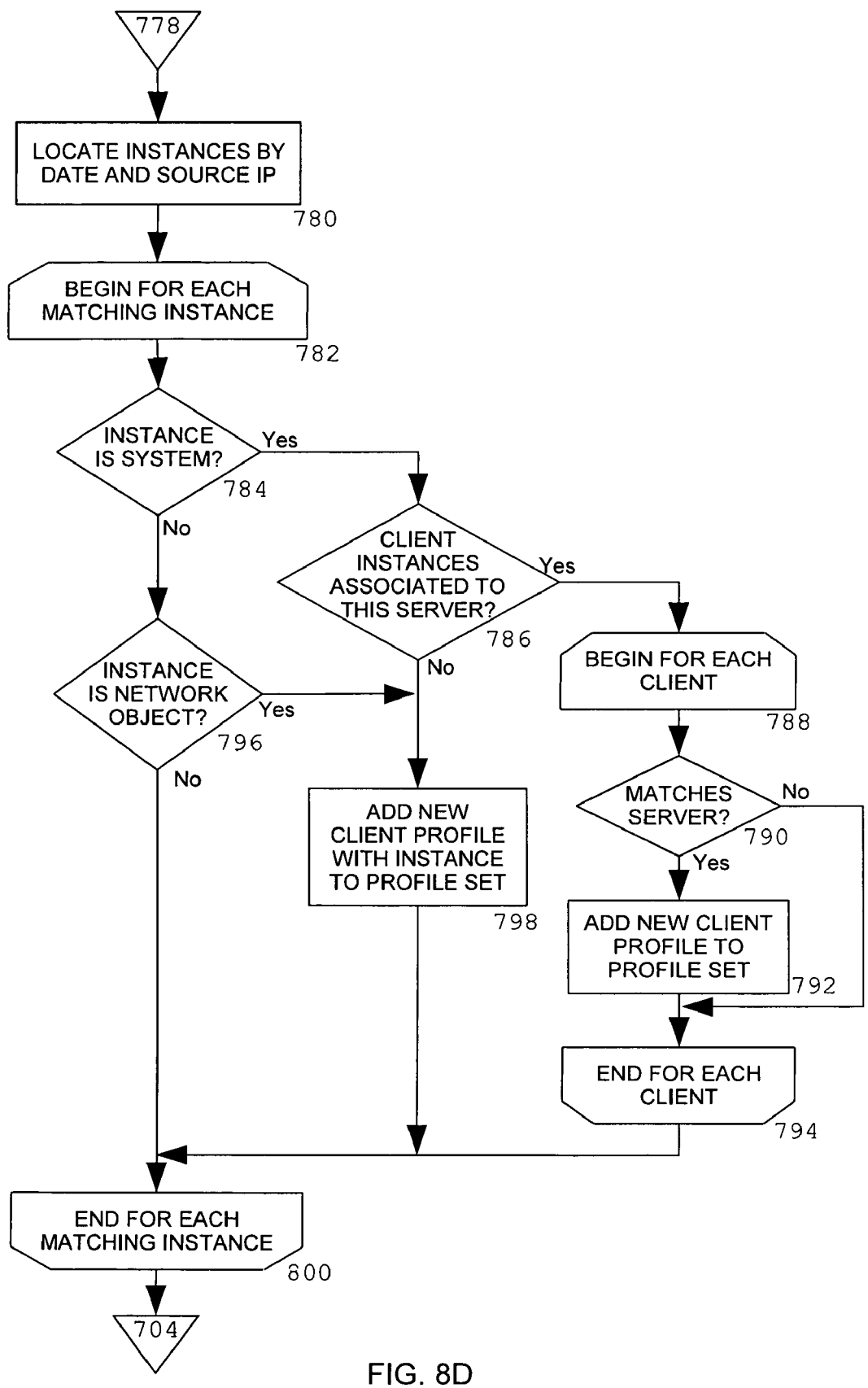
Figure 8E:
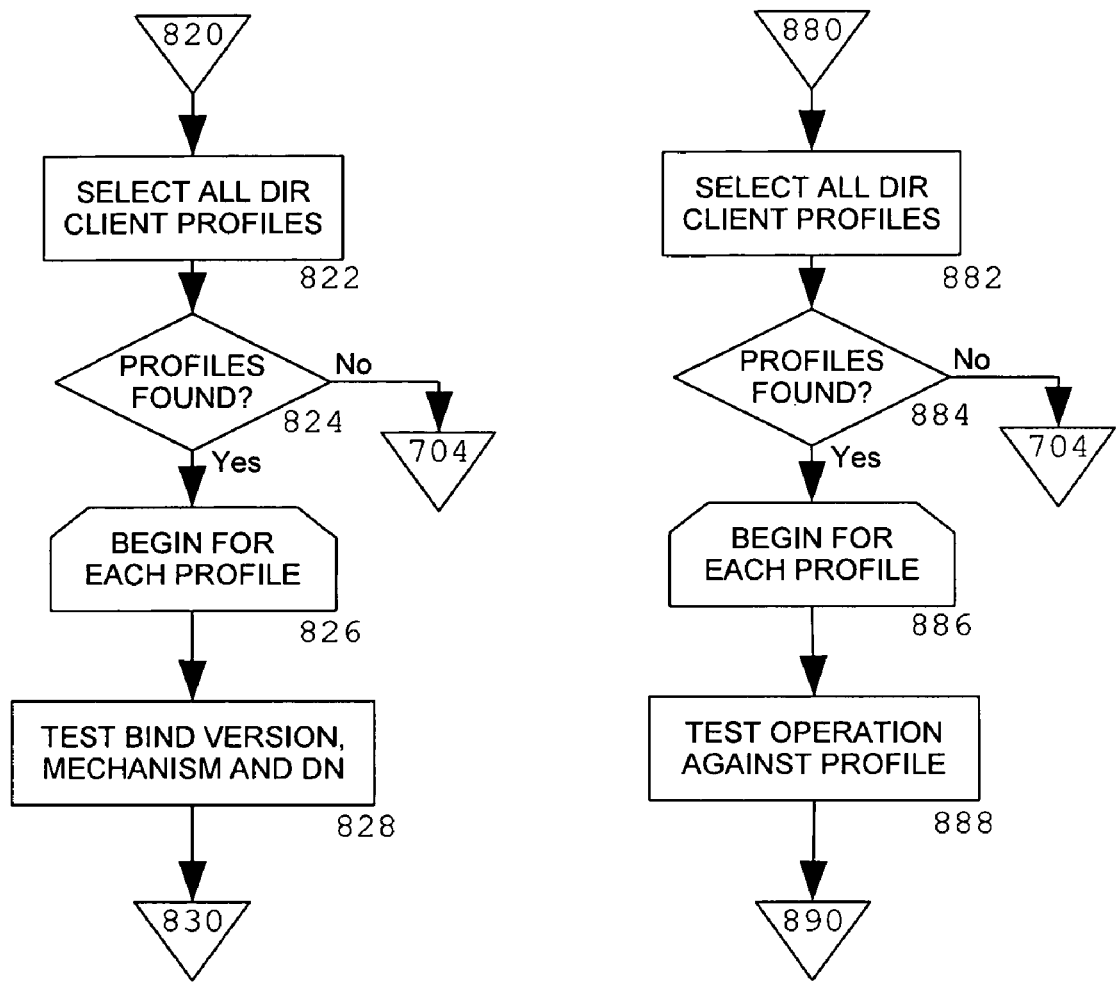
Figure 8F:
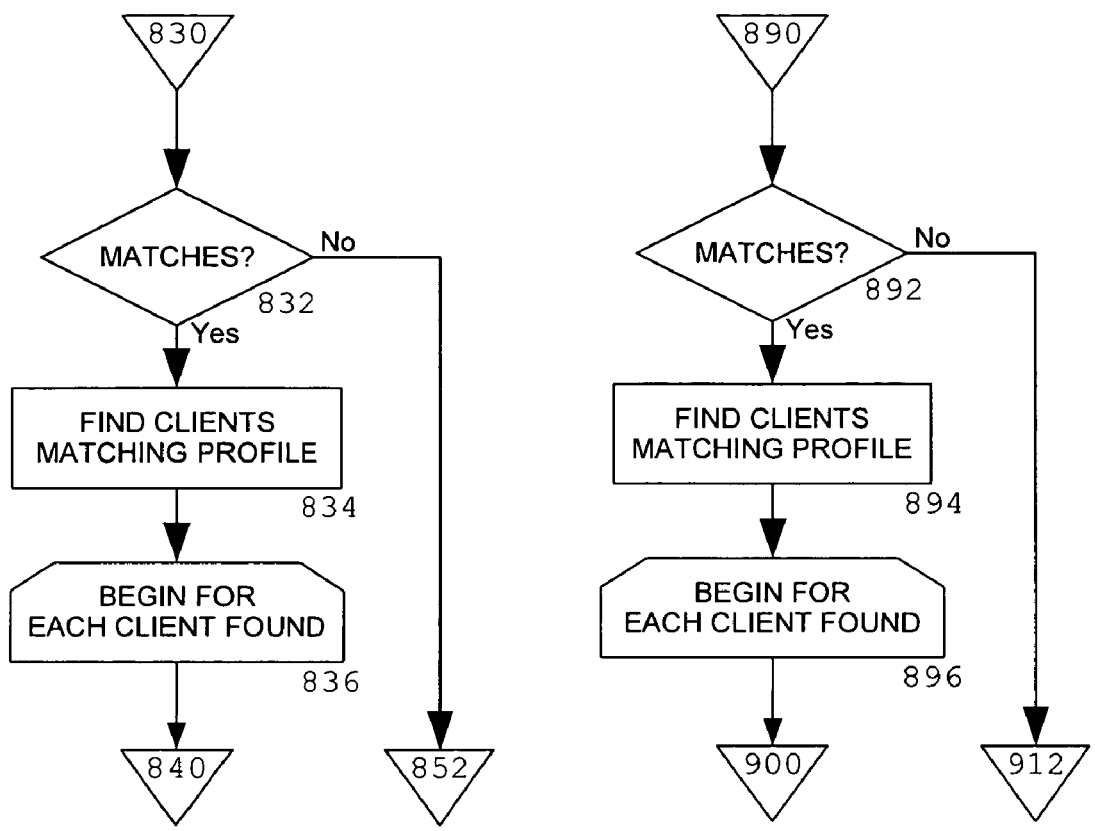
Figure 8G:
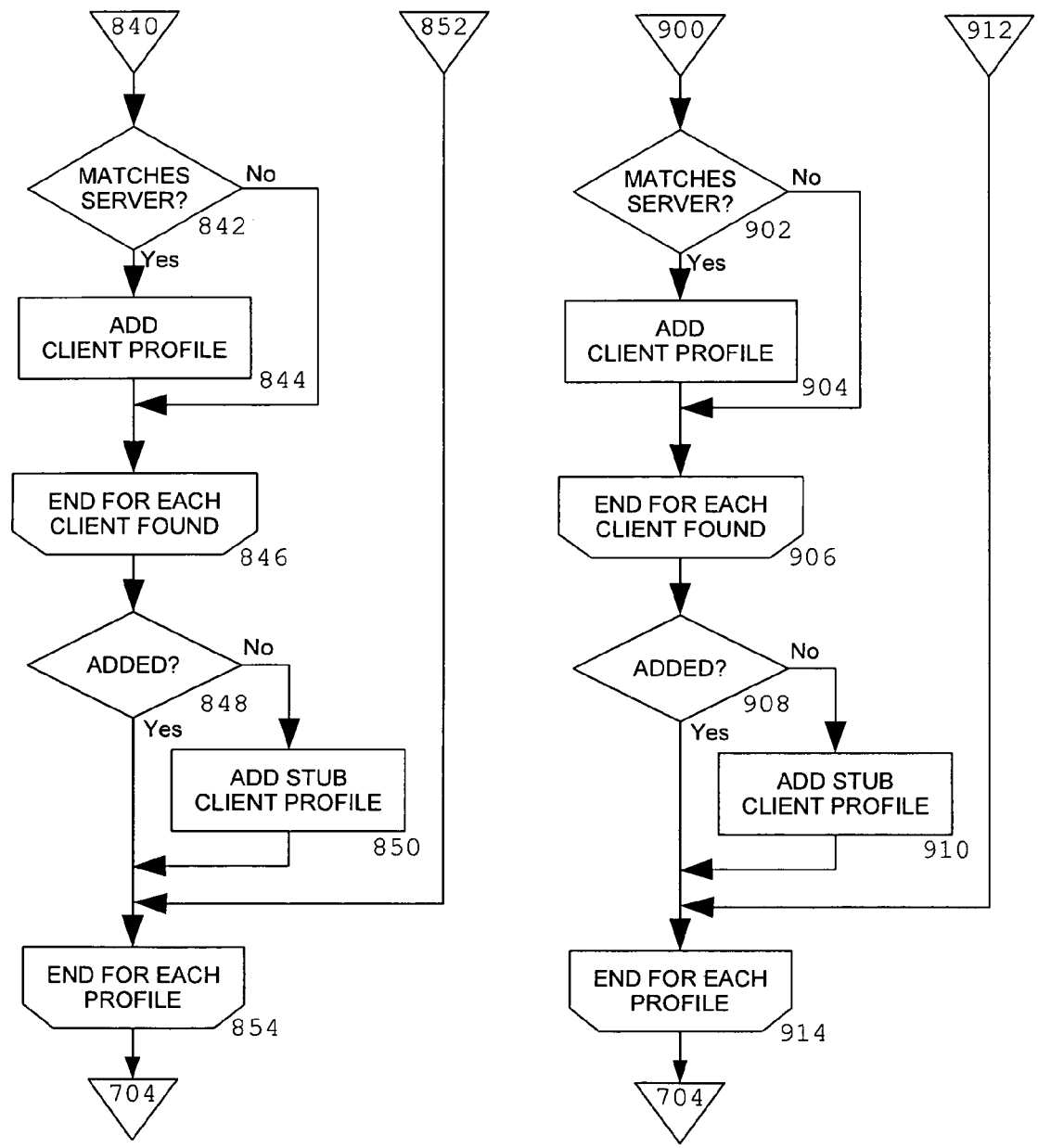

The agent component (14) is a software application that reads the access log generated by a directory server component (12), and provides the log records of that access log to the analysis server component (16) via a network protocol connection to the analysis server. The connection is protected from eavesdropping and modification in transit by being encapsulated in a Transport Layer Security (TLS) envelope. The behavior of the thread in an agent component is illustrated by the flowchart of FIG. 2A and FIG. 2B.

The analysis server component (16) is a software application that receives and processes log records sent by an agent component (14). The analysis server component comprises an in-memory data model and methods for accessing a database component (18).

The database component (18) is a software application that holds the persistent state of the analysis server component (16). The database can be implemented as an object-relational database, in which the database object model is that model defined by the Meta Schema of the Common Information Model (CIM). The CIM Meta-Data is specified in the document "CIM Schema: Version 2.15" by the Distributed Management Task Force of April 2007.

The database comprises the data model instances of the following data model classes:
Com_InformedControl_General_NetworkAddress (70),
Com_InformedControl_General_NetworkInterface (72),
Org_Dmtf_Cim_System (74), Com_InformedControl_Identity_DirectoryClient (76),
Com_InformedControl_Identity_DirectoryClientProfile (78),
Com_InformedControl_Identity_DirectoryClientProfileTemplate (80),
Com_InformedControl_Identity_DirectoryAccessCategory (82),
Com_InformedControl_Identity_DirectoryServerSet (84),
Com_InformedControl_Identity_DirectoryServer (86), and
Com_InformedControl_Identity_DirectorySubtree (88).

Instances of the Com_InformedControl_General_NetworkAddress data model class (70) each represent a network address assigned to a network interface of a computer system on a local area network.

Instances of the Com_InformedControl_General_NetworkInterface data model class (72) represent the network interface of a computer system to a local area network.

Instances of the Org_Dmtf_Cim_System data model class (74) each represent a computer system.

Instances of the Com_InformedControl_Identity_DirectoryClient data model class (76) each represent a directory client software component.

Instances of the Com_InformedControl_Identity_DirectoryClientProfile data model class (78) each represent a profile of the directory access protocol behavior of one or more directory client software components.

Instances of the Com_InformedControl_Identity_DirectoryClientProfileTemplate data model class (80) each represent a template of a profile of the directory access protocol behavior of one or more directory client software components.

Instances of the Com_InformedControl_Identity_DirectoryAccessCategory data model class (82) each represent a category of a set of requests in a directory access protocol.

Instances of the Com_InformedControl_Identity_DirectoryServerSet data model class (84) each represent a set of one or more directory server software components.

Instances of the Com_InformedControl_Identity_DirectoryServer data model class (86) each represent a directory server software component.

Instances of the Com_InformedControl_Identity_DirectorySubtree data model class (88) each represent a subtree or one or more directory entries held in the directory information tree of a directory server.

The database comprises the following data model associations:

Com_InformedControl_General_NetworkAddress (70)-Com_InformedControl_General_NetworkInterface (72)
Com_InformedControl_General_NetworkInterface (72)-Org_Dmtf_Cim_System (74)
Org_Dmtf_Cim_System (74)-Com_InformedControl_Identity_DirectoryClient (76)
Com_InformedControl_Identity_DirectoryClient (76)-Com_InformedControl_Identity_DirectoryClientProfile (78)
Com_InformedControl_Identity_DirectoryClientProfile (78)-Com_InformedControl_Identity_DirectoryClientProfileTemplate (80)
Com_InformedControl_Identity_DirectoryClient (76)-Com_InformedControl_Identity_DirectoryAccessCategory (82)
Com_InformedControl_Identity_DirectoryClientProfile (78)-Com_InformedControl_Identity_DirectoryAccessCategory (82)
Com_InformedControl_Identity_DirectoryClientProfileTemplate (80)-Com_InformedControl_Identity_DirectoryAccessCategory (82)
Com_InformedControl_Identity_DirectoryClient (76)-Com_InformedControl_Identity_DirectoryServerSet (84)
Com_InformedControl_Identity_DirectoryClient (76)-Com_InformedControl_Identity_DirectoryServer (86)
Com_InformedControl_Identity_DirectoryServerSet (84)-Com_InformedControl_Identity_DirectoryServer (86)
Com_InformedControl_Identity_DirectoryServer (86)-Com_InformedControl_Identity_DirectorySubtree (88)

The console component (20) is a software application that provides anomaly notifications generated by the analysis server (16) to the administrator (22).

Figure 12:
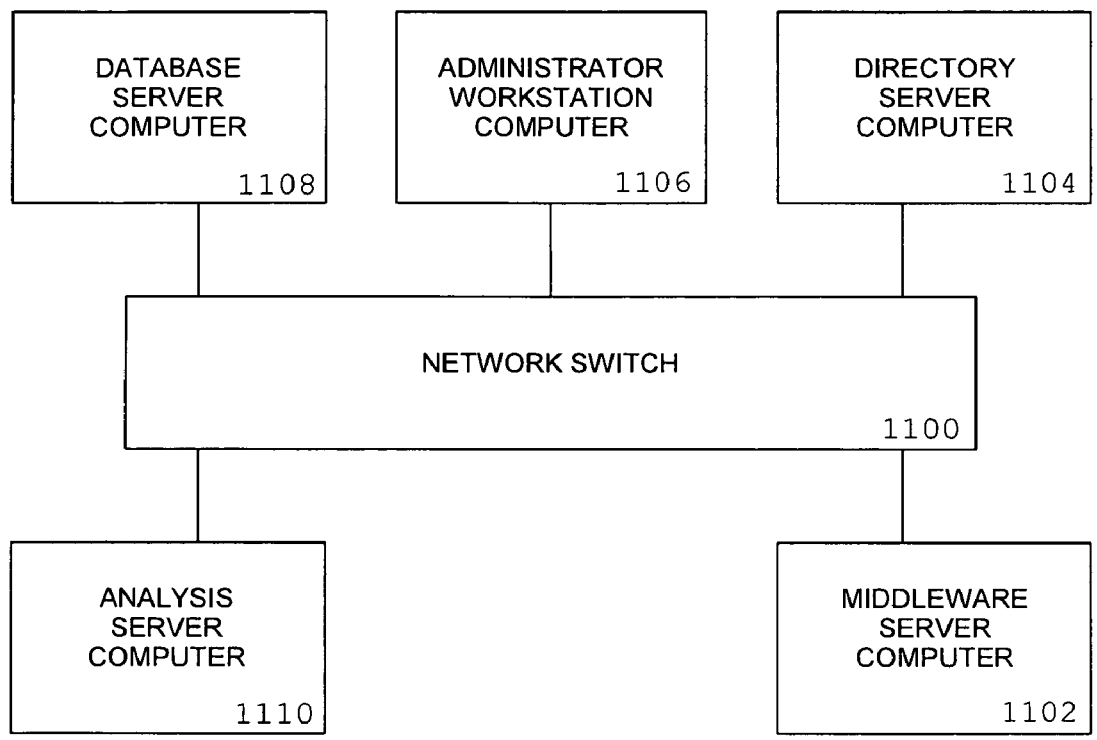
FIG. 12 is a diagram illustrating the typical components of an enterprise network and computer systems of a deployment of a system for anomalous directory client activity detection.

FIG. 12 illustrates the typical components of an enterprise computer network. A database server computer (1108), an administrator workstation computer (1106), a directory server computer (1104), a middleware server computer (1102) and an analysis server computer (1110) are attached to a network switch (1100). The client component (10) may be implemented as software running on a middleware server computer (1102). The directory server component (12) and agent component (14) may be implemented as software running on a directory server computer (1104). The analysis server component (16) may be implemented as software running on an analysis server computer (1110). The database component (18) may be implemented as software running on a database server computer (1108). The console component (20) may be implemented as software running on an administrator workstation computer (1106).

Figure 13:
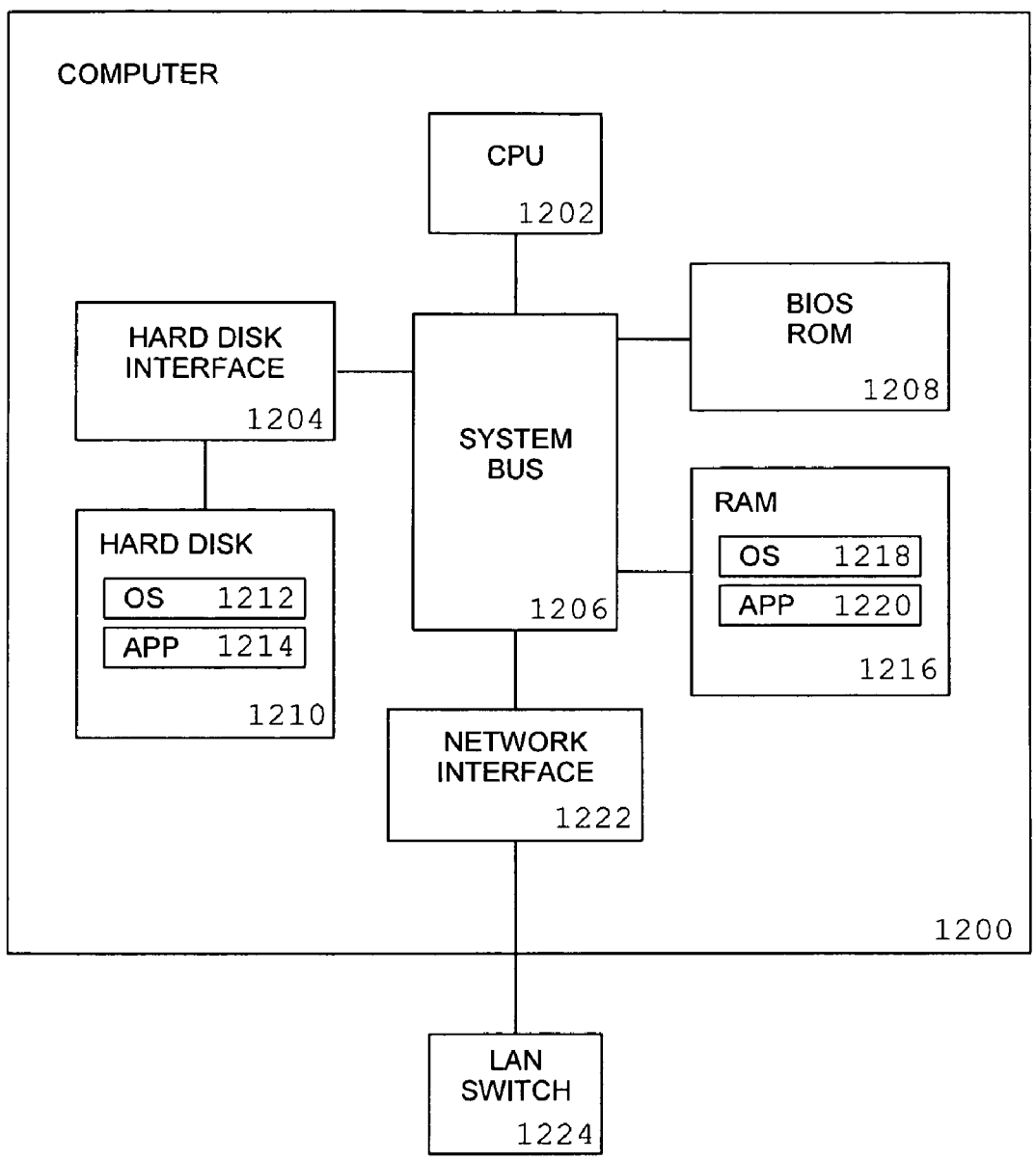
FIG. 13 is a diagram illustrating the typical components of a server computer.

The diagram of FIG. 13 illustrates the typical components of a computer for running server software applications. The components of the computer (1200) include a central processing unit (1202), a hard disk interface (1204) to a hard disk (1210), a system bus (1206), a BIOS ROM (1208), random access memory (1216), and a network interface (1222) to a LAN switch (1224). The hard disk stores the persistent state of the operating system (1212) and server applications (1214). The random access memory holds the currently running software and state of the operating system (1218) and server applications (1220).

Figure 14:
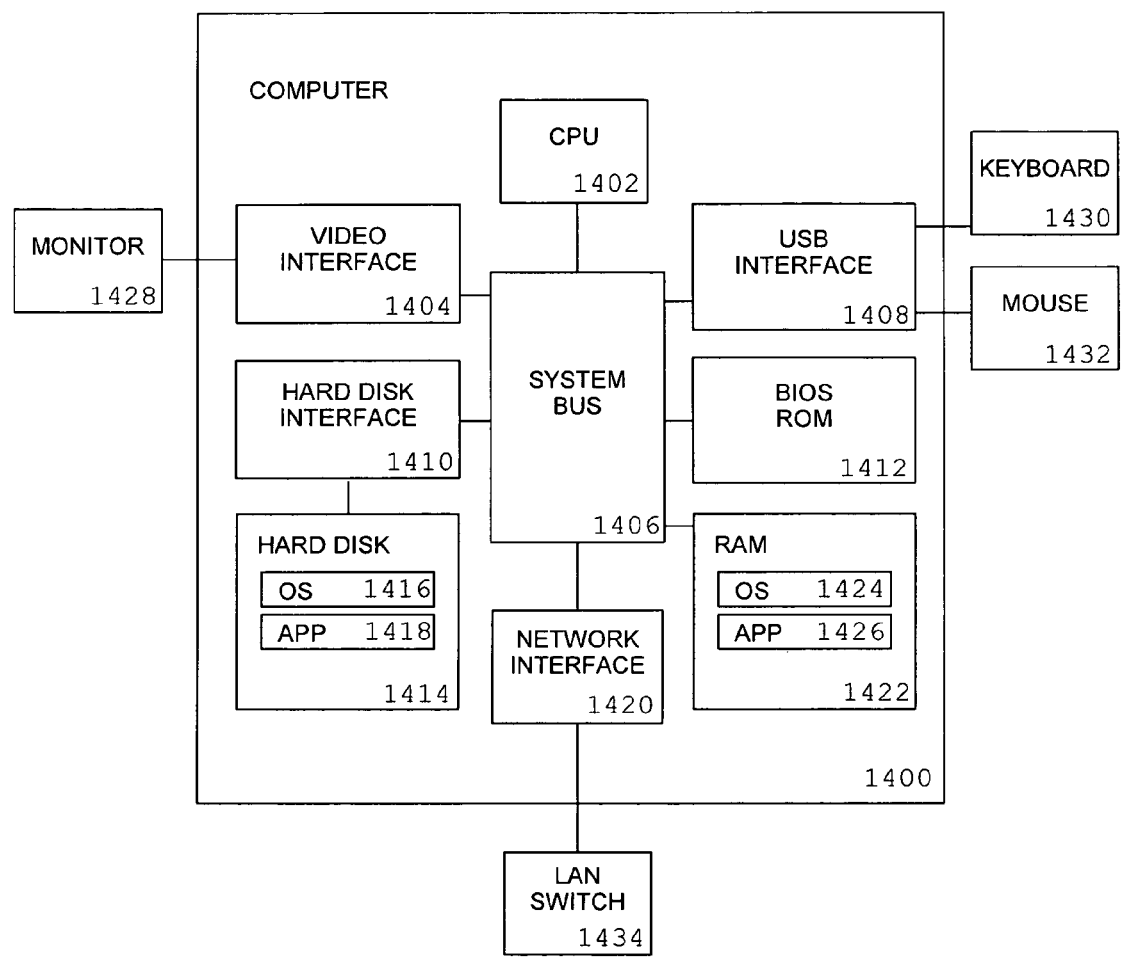
FIG. 14 is a diagram illustrating the typical components of a workstation computer.

The diagram of FIG. 14 illustrates the typical components of a computer for running client software applications. The components of the computer (1400) include a central processing unit (1402), a hard disk interface (1410) to a hard disk (1414), a system bus (1406), a BIOS ROM (1412), random access memory (1422), a video interface (1404) to a monitor (1428), a USB interface (1408) to a keyboard (1430) and mouse (1432), and a network interface (1420) to a LAN switch (1434). The hard disk stores the persistent state of the operating system (1416) and applications (1418). The random access memory holds the currently running software and state of the operating system (1424) and applications (1426).

Operation

The behavior of an agent component (14) is illustrated by the flowchart of FIG. 2A and FIG. 2B. The agent component comprises a single thread of control.

At step 34, the thread will connect to the analysis server component (16). If the connection failed, then at step 38 the thread will wait a predetermined period of time, and then return to step 34. Otherwise, at step 40, the thread will find the latest log record processed by the analysis server, by sending a query over the connection and receiving a response. At step 42, the thread will iterate through each log record in the access log generated by the directory server (12) which has not yet been processed by the analysis server. At step 44, the thread will send the log record to the analysis server over the connection. If the sending of records failed, or if the request from the analysis server indicated that it was in the training phase, then at step 50 the thread will disconnect from the analysis server, wait a predetermined period of time, and then return to step 34. Otherwise, at step 54 the thread will wait for the directory server (12) to add one or more log records to its access log. If the connection to the analysis server component is unavailable, then the thread will return to step 34. Otherwise, at step 58, the thread will send the recently added records to the analysis server over the connection. If the sending of the log records failed, then at step 62 the thread will disconnect from the analysis server, wait a predetermined period of time, and return to step 34. Otherwise, the thread will return to step 54.

The analysis server (16) has one or more threads of control. There are two phases of operation: the training phase, and the analysis phase. During the training phase, the behavior of a thread is illustrated by the flowchart of FIG. 4A, FIG. 4B, FIG. 4C and FIG. 4D. During the analysis phase, the behavior of a thread is illustrated by the flowchart of FIG. 7A, FIG. 7B, FIG. 7C, FIG. 7D, FIG. 7E, FIG. 7F, FIG. 7G, FIG. 7H, and FIG. 7I.

The behavior of the primary control flow path of the thread in the analysis server during the training phase is illustrated by the flowchart of FIG. 4A, FIG. 4B, FIG. 4C and FIG. 4D. At step 102, the thread will get a set of log records from the agent component (14), by responding to an incoming request on a connection from an agent with a response that indicates that the analysis server has not processed any log records, and that the analysis server is in the training phase. The thread will also create an empty set of training connections. The set of training connections holds zero or more open connection objects. Each open connection object comprises an optional IpV4Address element, an optional IpV6Address element, an optional AuthenticationMechanism element, a boolean SslUse element, an LdapOperationsInvoked element, an LdapOperationPatterns element, a set of operation objects, and a set of subtree scopes. The thread will also create an empty set of data model instances that will hold instances of the Com_InformedControl_Identity_DirectoryClientProfile, Com_InformedControl_Identity_DirectoryClient and Org_Dmtf_Cim_System data model classes. At step 104, the thread will iterate through each of the log records. At step 106, the thread will parse the log record to its component fields. At step 108, the thread will test whether the log record is an ignorable record: a record that does not indicate a connection being opened or closed to the directory server, or a protocol data unit (PDU) being sent or received on a connection to a directory server. If the log record is an ignorable record, then it will be skipped. Otherwise, at step 112 the thread will convert the date that the log record was generated to the time zone of the analysis server, and apply any correction necessary due to differences in the real time clock between the computer system where the directory server is installed and the computer system where the analysis server is installed. At step 114, the thread will check whether the log record indicates a new epoch. A new epoch occurs when the directory server process has started and any pre-existing network connections from clients to an earlier directory server process on that same computer system have been lost. If the log record is for a new epoch, then at step 118 the thread will call the "save training state" subroutine for each open connection object in the set of training connections, and clear the set of training connections. If the log record indicates a new connection was received by the directory server, then at step 132 the thread will create a new open connection object and add it to the set of training connections. The thread will set the properties IpV4Address and IpV6Address of the open connection object to the network address of the directory client which opened the connection. Otherwise, at step 134 the thread will search the set of training connections for the connection indicated by the log record. If an open connection object was not found, then at step 138 the thread will create a new open connection object and add it to the set of training connections. At step 140, the thread will test whether the log record indicates the connection to the directory server was closed. If it was, then at step 142 the thread will call the "save training state" subroutine for the open connection object, and remove the open connection object from the set of training connections. Otherwise, at step 144 the thread will test whether the log record is for a new request that was received by the directory server. If it was, then at step 146 the thread will add a new operation object describing that request to the set of operation objects on the open connection object. Otherwise, at step 148 the thread will search the set of operation objects on the open connection object for a record corresponding to the operation in the log message. If an operation object was not located, or if the log record does not indicate the completion of a request, then the log record is skipped. Otherwise, if an operation object was located and the log record indicates the completion of the request, at step 154 the thread will save the result of the operation on the operation object in the set of operation objects on the open connection object. At step 156, the thread will loop back to step 106 for each log record until there are no more log records to be processed. At step 170, the thread will iterate through each open connection object in the set of training connections. At step 172, the thread will call the "save training state" subroutine for that open connection object. At step 174, the thread will loop back to step 172 until all open connection objects have been processed. At step 176, the thread will iterate through each Com_InformedControl_Identity_DirectoryClientProfile in the set of data model instances, and at step 178 the thread will save the Com_InformedControl_Identity_DirectoryClientProfile to the database (18). At step 184, the thread will iterate through each Com_InformedControl_Identity_DirectoryClient in the set of data model instances, and at step 186 the thread will save the Com_InformedControl_Identity_DirectoryClient to the database (18). At step 190, the thread will iterate through each Org_Dmtf_Cim_System in the set of data model instances, and at step 192 the thread will save the Org_Dmtf_Cim_System to the database (18). The training phase is then completed.

The behavior of the thread in the "save training state" subroutine is illustrated by the flowchart of FIG. 5A, FIG. 5B, FIG. 5C and FIG. 5D. The thread provides to the subroutine as input an open connection object. At step 212, the thread will check the database and memory for clients from the same client system as the source of the connection, by searching the set of data model instances and the database (14) for a data model instance of the data model class Com_InformedControl_Identity_DirectoryClient which has an association to a data model instance of the data model class Org_Dmtf_Cim_System, which has an association to a data model instance of the data model class Com_InformedControl_General_NetworkInterface, which has an association to a data model instance of the data model class Com_InformedControl_General_NetworkAddress in which the properties IpV4Address and IpV6Address match that of the open connection object, and that data model instance of the data model class Com_InformedControl_Identity_DirectoryClient has an association to the data model instance of the data model class Com_InformedControl_Identity_DirectoryServer corresponding to the directory server whose log is being processed. If no data model instances of Com_InformedControl_Identity_DirectoryClient were found, then the thread will continue processing at step 242. Otherwise, if one or more existing client data model instances are found, then at step 216 the thread will compare the profile of each client (which the thread obtains by following the association Com_InformedControl_Identity_DirectoryClient-Com_InformedControl_Identity_DirectoryClientProfile) with the set of operations on the open connection object by matching the properties LdapBindVersion, AuthenticationMechanism, SslUse, BindDn, LdapOperationsInvoked, LdapOperationPatterns and SubtreeScopes to the properties of the open connection object. If there are one or more client data model instances which have a matching profile, then the thread will return from the subroutine. Otherwise, if there is no data model instance client that has a matching profile, then at step 220 the thread will test whether any of the profiles can be generalized, by testing each Com_InformedControl_Identity_DirectoryClientProfile instance in the database to determine, for each instance, whether there is a single set-valued property of that instance which could have an additional value added that would cause the properties to match the set of operations on the open connection object. If a profile is found that can be generalized, then at step 226 the thread will generalize the profile instance by changing the property identified in step 220, and the thread will return from the subroutine. Otherwise, if the profile cannot be generalized, then the thread will continue processing at step 260.

At step 242, the thread will check for a directory client profile template, by searching the set of data model instances and the database (14) for an instance of the data model class Com_InformedControl_Identity_DirectoryClientProfileTemplate in which the AuthenticationMechanism, SslUse, LdapOperationsInvoked and LdapOperationPatterns properties of the instance match those properties of the open connection object. If a matching instance was found, then at step 246 the thread will increment the counter property UseCount of the Com_InformedControl_Identity_DirectoryClientProfileTemplate and continue at step 248. At step 248 the thread will add a data model instance of the data model class Com_InformedControl_Identity_DirectoryClientProfile, a data model instance of the data model class Com_InformedControl_Identity_DirectoryClient, and a data model instance of the data model class Org_Dmtf_Cim_System to the set of data model instances, and then the thread will return from the subroutine. In the data model instance of the data model class Com_InformedControl_Identity_DirectoryClientProfile the thread will set the properties LdapBindVersion, AuthenticationMechanism, SslUse, BindDn, LdapOperationsInvoked, LdapOperationPatterns and SubtreeScopes to correspond to those of the open connection object, and associate it to the matching instance of Com_InformedControl_Identity_DirectoryClientProfileTemplate that was found at step 242. In the data model instance of the data model class Com_InformedControl_Identity_DirectoryClient the thread will associate it to the instance of the Com_InformedControl_Identity_DirectoryClientProfile being added, to the instance of the Org_Dmtf_Cim_System being added, and to the data model instance of the data model class Com_InformedControl_Identity_DirectoryServer corresponding to the directory server whose log is being processed. In the data model instance of the data model class Org_Dmtf_Cim_System the thread will associate to an instance of the data model class Com_InformedControl_General_NetworkInterface, and associate the instance of the data model class Com_InformedControl_General_NetworkInterface to an instance of the data model class Com_InformedControl_General_NetworkAddress in which one of the properties IPv4Address or IPv6Address contain the IP address of the client. Otherwise, at step 250 the thread will check for a profile by searching the set of data model instances and the database for a data model instance of the data model class Com_InformedControl_Identity_DirectoryClientProfile in which the properties of the data model instance LdapBindVersion, AuthenticationMechanism, SslUse, BindDn, LdapOperationsInvoked, LdapOperationPatterns and SubtreeScopes match those properties of the open connection object. If a profile data model instance was found and that profile data model instance can be generalized, then the thread will continue at step 226. The thread will determine whether a profile data model instance can be generalized by testing whether there is a single set-valued property of that instance which could have an additional value added that would cause the properties to match the set of operations on the open connection object. Otherwise, if the connection has no failed requests, then at step 256 the thread will add a data model instance of the data model class Com_InformedControl_Identity_DirectoryClientProfile, a data model instance of the data model class Com_InformedControl_Identity_DirectoryClient and a data model instance of the data model class Org_Dmtf_Cim_System to the set of data model instances, and the thread will return from the subroutine. In the data model instance of the data model class Com_InformedControl_Identity_DirectoryClientProfile the thread will set the properties LdapBindVersion, AuthenticationMechanism, SslUse, BindDn, LdapOperationsInvoked, LdapOperationPatterns and SubtreeScopes to those properties of the open connection object. In the data model instance of the data model class Com_InformedControl_Identity_DirectoryClient the thread will associate it to the instance of the Com_InformedControl_Identity_DirectoryClientProfile being added, to the instance of the Org_Dmtf_Cim_System being added, and to the data model instance of the data model class Com_InformedControl_Identity_DirectoryServer corresponding to the directory server whose log is being processed. The thread will associate the data model instance of the data model class Org_Dmtf_Cim_System to an instance of the data model class Com_InformedControl_General_NetworkInterface, and associate the instance of the data model class Com_InformedControl_General_NetworkInterface to an instance of the data model class Com_InformedControl_General_NetworkAddress in which one of the properties IPv4Address or IPv6Address contain the IP address of the client. If the connection has failed requests, then the thread will continue processing at step 282.

At step 260, the thread will check for a template by searching the set of data model instances and the database for a data model instance of the data model class Com_InformedControl_Identity_DirectoryClientProfileTemplate in which the properties of the instance AuthenticationMechanism, SslUse, LdapOperationsInvoked and LdapOperationPatterns match those properties of the open connection object. If a matching template data model instance was found, then at step 264 the thread will add a data model instance of the data model class Com_InformedControl_Identity_DirectoryClientProfile and a data model instance of the data model class Com_InformedControl_Identity_DirectoryClient to the set of data model instances, and the thread will return from the subroutine. In the data model instance of the data model class Com_InformedControl_Identity_DirectoryClientProfile the thread will set the properties LdapBindVersion, AuthenticationMechanism, SslUse, BindDn, LdapOperationsInvoked, LdapOperationPatterns and SubtreeScopes to those properties of the open connection object, and associate it to the matching instance of Com_InformedControl_Identity_DirectoryClientProfileTemplate that was found at step 260. The thread will associate the data model instance of the data model class Com_InformedControl_Identity_DirectoryClient to the data model instance of Com_InformedControl_Identity DirectoryClientProfile being added, to the data model instance the Org_Dmtf_Cim_System instance that was found at step 212, and to the data model instance of the data model class Com_InformedControl_Identity_DirectoryServer corresponding to the directory server whose log is being processed. If a matching template was found, and the connection has failed requests, then the thread will continue at step 282. Otherwise, if a matching template was found and the connection has no failed requests, then at step 268 the thread will add a data model instance of the data model class Com_InformedControl_Identity_DirectoryClientProfile and a data model instance of the data model class Com_InformedControl_Identity_DirectoryClient to the set of data model instances, and the thread will return from the subroutine. In the data model instance of the data model class Com_InformedControl_Identity_DirectoryClientProfile the thread will set the properties LdapBindVersion, AuthenticationMechanism, SslUse, BindDn, LdapOperationsInvoked, LdapOperationPatterns and SubtreeScopes to those properties of the open connection object. In the data model instance of the data model class Com_InformedControl_Identity_DirectoryClient the thread will associate it to the data model instance of the data model class Com_InformedControl_Identity_DirectoryClientProfile being added, to the Org_Dmtf_Cim_System data model instance that was found at step 212, and to the data model instance of the data model class Com_InformedControl_Identity_DirectoryServer corresponding to the directory server whose log is being processed.

At step 282, the thread will check for a profile template by searching the set of data model instances and the database for a data model instance of the data model class Com_InformedControl_Identity_DirectoryClientProfileTemplate in which the properties of the instance AuthenticationMechanism, SslUse, LdapOperationsInvoked and LdapOperationPatterns match those properties of the open connection object. If a matching template data model instance was not found, then the thread will return from the subroutine. If a data model instance of the data model class Org_Dmtf_Cim_System is needed, due to a data model instance of the data model class Org_Dmtf_Cim_System having not already been located or added during this subroutine call, then at step 288, the thread will add a data model instance of the data model class Org_Dmtf_Cim_System to the set of data model instances. The thread will associate the data model instance of the data model class Org_Dmtf_Cim_System to an instance of the data model class Com_InformedControl_General_NetworkInterface, and associate the instance of the data model class Com_InformedControl_General_NetworkInterface to an instance of the data model class Com_InformedControl_General_NetworkAddress in which one of the properties IPv4Address or IPv6Address contain the IP address of the client. At step 290, the thread will add a data model instance of the data model class Com_InformedControl_Identity_DirectoryClientProfile and a data model instance of the data model class Com_InformedControl_Identity_DirectoryClient to the set of data model instances. In the data model instance of the data model class Com_InformedControl_Identity_DirectoryClientProfile the thread will set the properties LdapBindVersion, AuthenticationMechanism, SslUse, BindDn, LdapOperationsInvoked, LdapOperationPatterns and SubtreeScopes to those properties of the open connection object, and the thread will associate it to the Com_InformedControl_Identity_DirectoryClientProfileTemplate located at step 282. In the data model instance of the data model class Com_InformedControl_Identity_DirectoryClient the thread will associate it to the data model instance of the data model class Com_InformedControl_Identity_DirectoryClientProfile, to the data model instance of the data model class Org_Dmtf_Cim_System, and to the data model instance of the data model class Com_InformedControl_Identity_DirectoryServer corresponding to the directory server whose log is being processed. The thread will then return from the subroutine.

The behavior of the primary control flow path of the thread in the analysis server during the analysis phase is illustrated by the flowchart of FIG. 7A, FIG. 7B, FIG. 7C, FIG. 7D, FIG. 7E, FIG. 7F, FIG. 7G, FIG. 7H, and FIG. 7I.

At step 402, the thread will clear the connection state by creating a new empty epoch set object (300). At step 406, the thread will wait for a log record from the agent component (14), by responding to an incoming request on a connection from an agent. At step 408, the thread will parse the log record to its component fields. If the log record is an ignorable record (a record that does not indicate a connection being opened or closed to the directory server, or a protocol data unit being sent or received on a connection to a directory server), then the record is ignored and the thread will loop back to step 406. Otherwise, at step 412 the thread will convert the date that the log record was generated to the time zone of the analysis server, and apply any correction necessary due to the differences in the real time clock between the computer system where the directory server is installed and the computer system where the analysis server is installed. At step 414, the thread will check whether the log record is for a new epoch. A new epoch occurs when the directory server process has started and any pre-existing network connections from clients to an earlier directory server process on that same computer system have been lost. If this log record is for a new epoch, and there is an existing epoch, then at step 424, the thread will add the existing epoch to the set of epochs (300) in memory. If this log record is for a new epoch, then at step 426 the thread will create a new epoch object (302). Otherwise, if this log record is not for a new epoch, but there is no existing epoch, then at step 430 the thread will create a new epoch object (302). If this log record is for a new connection, then the thread will continue processing at step 652. Otherwise, at step 434 the thread will search the set of connection objects (308) on the epoch object (302) to find an object for the connection. If a connection was not found, then at step 444 the thread will create connection object (308), and at step 446 the thread will add the connection object to the epoch object. If the log record indicates that the connection is closed, then at step 450 the thread will set that the connection is closed by setting the Is Open flag in the connection object to FALSE, and the thread will loop back to step 406. Otherwise, if the log record indicates a new request from a client, then at step 454 the thread will create a new operation object (34), add the operation object to the connection object, and the thread will loop back to step 406. Otherwise, at step 456 the thread will find the operation indicated by the log record in the connection by searching the set of associated operation objects for one with a matching operation id. If an operation object was not found, or if the log record indicates that the request is not yet completed (e.g., the log record is for a SearchResultEntry being returned), then the thread will loop back to step 406. Otherwise, at step 470 the thread will switch the control flow based on the operation type of the request and the corresponding result. If the result is a bind result (in LDAP, the protocolOp is bindResponse), then the thread will continue processing at step 502. If the result is a search result done (in LDAP, the protocolOp is searchResDone), then the thread will continue processing at step 562. If the result is a compare result (in LDAP, the protocolOp is compareResponse), then the thread will continue processing at step 582. If the result is an extended result (in LDAP, the protocolOp is extendedResp), then the thread will continue processing at step 602. If the result is an add request, a delete result, a modify result or a moddn result (in LDAP, the protocolOp is modifyResponse, addResponse, delResponse or modDNResponse), then the thread will continue processing at step 622. Otherwise, the thread will loop back to step 406.

At step 484, the thread will complete the processing of the operation, and loop back to step 406.

At step 502, the thread will test the result code from the response message represented in the log record. If the result code is success, and the name DN in the bind request is of zero length, then at step 508 the thread will create a new dir constraint bind object (330), call the "apply constraint" subroutine, set the subject decision in the operation object to DIR_BIND_ANON_SUCCESS (at step 510), and then the thread will continue processing at step 484. Otherwise, if the result code is success, the name DN in the bind request is not of zero length, and the authentication choice of the bind request is "simple", then at step 514 the thread will create a new dir constraint bind object (330), call the "apply constraint" subroutine, set the subject decision in the operation object to DIR_BWND_SIMPLE_SUCCESS (at step 516), and then the thread will continue processing at step 484. Otherwise, if the result code is success, the name DN in the bind request is not of zero length, and the authentication choice of the bind request is not "simple", then at step 518 the thread will create a new dir constraint bind object (330), call the "apply constraint" subroutine, set the subject decision in the operation object to DIR_BIND_SIMPLE_SUCCESS (at step 520), and then the thread will continue processing at step 484. If the result code is 14, then the thread will loop back to step 406. If the authentication choice of the bind request is "simple", and the name DN in the bind request is of zero length, then at step 536 the thread will create a new dir constraint bind object (330), call the "apply constraint" subroutine, set the subject decision in the operation object to DIR_BIND_ANON_FAILURE (at step 538), and then the thread will continue processing at step 548. Otherwise, if the authentication choice in the bind request is "simple", and the name DN in the bind request is not of zero length, then at step 540 the thread will create a new dir constraint bind object (330), call the "apply constraint" subroutine, set the subject decision in the operation object to DIR_BIND_SIMPLE_FAILURE (at step 542), and then the thread will continue processing at step 548. Otherwise, at step 544 the thread will create a new dir constraint bind object (330), call the "apply constraint" subroutine, set the subject decision in the operation object to DIR_BIND_SASL_FAILURE (at step 546), and then the thread will continue processing at step 548.

At step 548, the thread will create a new bind anomaly object (314), call the "report anomaly" subroutine, and the thread will continue processing at step 484.

At step 562, the thread will create a new dir constraint op object (332) and call the "apply constraint" subroutine. If the result of the request is success, then at step 566 the thread will set the subject decision to DIR_SEARCH_SUCCESS and the thread will continue at step 484. Otherwise, at step 568 the thread will set the subject decision to DIR_SEARCH_FAILURE. At step 570 the thread will create a new error anomaly object (316) and call the "report anomaly" subroutine. The thread will continue at step 484.

At step 582, the thread will create a new dir constraint op object and call the "apply constraint" subroutine. If the result of the request is one of the value success, the value compareFalse or the value compareTrue, then at step 586 the thread will set the subject decision in the operation object to DIR_SEARCH_SUCCESS and the thread will continue at step 484. Otherwise, at step 588 the thread will set the subject decision in the operation object to DIR_SEARCH_FAILURE. At step 590 the thread will create a new error anomaly object (316) and call the "report anomaly" subroutine. The thread will continue at step 484.

At step 602, the thread will create a new dir constraint op object (332) and call the "apply constraint" subroutine. If the result of the operation is success, then at step 606 the thread will set the subject decision to DIR_OP_SUCCESS and the thread will continue at step 484. Otherwise, at step 608 the thread will set the subject decision to DIR_OP_FAILURE. At step 610 the thread will create a new error anomaly object (316) and call the "report anomaly" subroutine. The thread will continue at step 484.

At step 622, the thread will create a new dir constraint op object (332) and call the "apply constraint" subroutine. If the result of the operation is success, then at step 626 the thread will set the subject decision to DIR_OP_SUCCESS and the thread will continue at step 484. Otherwise, at step 628 the thread will set the subject decision to DIR_OP_FAILURE. At step 630 the thread will create a new error anomaly object (316) and call the "report anomaly" subroutine. The thread will continue at step 484.

At step 652, the thread will create a connection object (308). If the source of the request is local to the computer system where the directory server is installed (e.g., the client is software installed on that same computer system), then at step 656 the thread will create an access constraint conn object (328) which associates to a data model instance of Org_Dmtf_Cim_System corresponding to the computer system where the directory server is installed. Otherwise, if the source is not local, then at step 658 the thread will create an access constraint conn object (328) for the network address of the requesting client. At step 660, the thread will add the connection object to the epoch object. At step 662, the thread will call the "apply constraint" subroutine with the access constraint conn object. The thread will then loop back to step 406.

The behavior of a thread in the "apply constraint" subroutine is illustrated by the flowchart of FIG. 8A, FIG. 8B, FIG. 8C, FIG. 8D, FIG. 8E, FIG. 8F and FIG. 8G. A thread enters the subroutine with two input parameters: a constraint object (306) and a connection object (308).

At step 702, the thread will test whether the connection object constraint unmet flag is false. If the connection object constraint unmet flag is false, then the thread will continue processing at step 752. Otherwise the thread will continue processing at step 706.

At step 706, the thread will test whether the set of dir access client profile objects associated with the connection, the profile set, is empty. If the profile set is empty, then at step 708 the thread will set the connection object constraint unmet flag to true, at step 710 the thread will create an unmet anomaly object (312) and call the "report anomaly" subroutine, and the thread will continue processing at step 744. Otherwise, at step 712 the thread will iterate through each added dir access client profile object. At step 714, the thread will iterate through each existing constraint in the connection constraint set. At step 716, the thread will test the profile against the existing constraint by calling the "constraint test" subroutine. If not all the constraints apply to the profile, then at step 722 the thread will remove the profile from the connection profile set. After the thread has traversed each added profile, then at step 732 the thread will iterate through each dir access client profile object in the connection profile set. At step 734, the thread will test the profile against the new constraint by calling the "constraint test" subroutine. If the constraint does not apply, then at step 738 the thread will remove the dir access client profile from the connection profile set. After iterating through each profile in the connection profile set, the thread will continue processing at step 744.

At step 744, the thread will add the constraint to the connection constraint set by associating it with the connection object. The thread will then exit the subroutine and return to the calling procedure.

At step 752, the thread will test the type of the constraint object (306). If the constraint object is an access constraint conn object (328), and the constraint has an associated source system, then at step 758 the thread will create a dir access client profile object (318) with an associated source system (320), add the dir access client profile object to the connection profile set, and then the thread will loop back to continue processing at step 706. If the constraint object is an access constraint conn object (328) and the constraint object does not have an associated source system, then the thread will continue processing at step 780. If no profiles are in the connection profile set and the constraint object is a dir constraint bind object (330), then the thread will continue processing at step 822. If no profiles are in the connection profile constraint and the constraint object is a dir constraint op object (332), then the thread will continue processing at step 882. Otherwise the thread will continue processing at step 706.

At step 780, the thread will locate instances in the database, by calling the "network locate" subroutine, providing to it the date from the log record and the source IP address of the directory client. At step 782, the thread will traverse each located instance returned by this subroutine. If the instance is an instance of the data model class Org_Dmtf_Cim_System (74), and there are one or more instances of the data model class Com_InformedControl_Identity_DirectoryClient in the database which are associated to that instance of the data model class Org_Dmtf_Cim_System, then the thread will continue processing at step 788. If the instance is an instance of the data model class Org_Dmtf_Cim_System (74), and there are no instances of the data model class Com_InformedControl_Identity_DirectoryClient in the database which are associated to that instance, then at step 798 the thread will add a new Dir Access Client Profile (318) object to the connection profile set. The thread will associate that object with the instance of the data model class Org_Dmtf_Cim_System. If the instance is not an instance of the data model class Org_Dmtf_Cim_System (74), but it is an instance of a class that is a subclass of the data model class Com_InformedControl_General_NetworkObject, then at step 798 the thread will add a new Dir Access Client Profile (318) object to the connection profile set. The thread will associate that object with the instance. At step 800, after all the located instances have been traversed, the thread will continue processing at step 706.

At step 788 the thread will traverse the instances of the data model class Com_InformedControl_Identity_DirectoryClient (76). At step 790, the thread will test whether that instance has an association to the instance of the data model class Org_Dmtf_Cim_System identified at step 782. If the instance of Com_InformedControl_DirectoryClient does have such an association, then at step 792 the thread will add a new Dir Access Client Profile (318) object to the connection profile set. The thread will associate that object with the instance of the data model class Org_Dmtf_Cim_System and the instance of the data model class Com_InformedControl_Identity_DirectoryClient. After each Com_InformedControl_Identity_DirectoryClient instance has been traversed, the thread will loop back to step 782 for the next matching instance.

At step 822, the thread will retrieve from the database all the instances of the data model class Com_InformedControl_Identity_DirectoryClientProfile (78). If no instances were found, then the thread will continue processing at step 706. Otherwise, at step 826, the thread will iterate through each Com_InformedControl_Identity_DirectoryClientProfile instance found. At step 828, the thread will compare the bind version, authentication mechanism and authentication distinguished name (DN) of the client authenticating on the connection with those properties of the instance of the Com_InformedControl_Identity_DirectoryClientProfile data model class DN. If they do not match, then the thread will loop back to step 826 to continue with the next Com_InformedControl_Identity_DirectoryClientProfile instance. Otherwise, at step 834, the thread will search the database for instances of the data model class Com_InformedControl_Identity_DirectoryClient which are associated to the Com_InformedControl_Identity_DirectoryClientProfile instance. At step 836, the thread will iterate through each instance of Com_InformedControl_Identity_DirectoryClient. At step 842, the thread will test whether the instance of the data model class Com_InformedControl_Identity_DirectoryClient is associated to the Com_InformedControl_Identity_DirectoryServer instance for the directory server which generated the log that is being parsed. If the instance is associated, then at step 844 the thread will create a new Dir Access Client Profile (318) object and add it to the connection profile set. The thread will associate that object with the instance of the data model class Com_InformedControl_Identity_DirectoryClient. After all the Com_InformedControl_Identity_DirectoryClient instances have been traversed, if no Dir Access Client Profile objects have been added to the connection profile set, then at step 850 the thread will create a new Dir Access Client Profile object and add it to the connection profile set. After all the Com_InformedControl_Identity_DirectoryClientProfile instances have been traversed, the thread will continue processing at step 706.

At step 882, the thread will retrieve from the database all the instances of the data model class Com_InformedControl_Identity_DirectoryClientProfile (78). If no instances were found, then the thread will continue processing at step 706. Otherwise, at step 886, the thread will iterate through each Com_InformedControl_Identity_DirectoryClientProfile instance found. At step 888, the thread will compare the fields of the dir constraint op object with the values of the properties LdapOperationsInvoked and LdapOperationPatterns of the instance. If the fields of the dir constraint op object do not match, then the thread will loop back to step 886 to continue with the next Com_InformedControl_Identity_DirectoryClientProfile instance. Otherwise, at step 894, the thread will search the database for instances of the data model class Com_InformedControl_Identity_DirectoryClient which are associated to the Com_InformedControl_Identity_DirectoryClientProfile instance. At step 896, the thread will iterate through each instance of Com_InformedControl_Identity_DirectoryClient. At step 902, the thread will test whether the instance of the data model class Com_InformedControl_Identity_DirectoryClient is associated to the Com_InformedControl_Identity_DirectoryServer instance for the directory server which generated the log that is being parsed. If the instance is associated, then at step 904 the thread will create a new Dir Access Client Profile (318) object and add it to the connection profile set. The thread will associate that object with the instance of the data model class Com_InformedControl_Identity_DirectoryClient. After all the Com_InformedControl_Identity_DirectoryClient instances have been traversed, if no Dir Access Client Profile objects have been added to the connection profile set, then at step 910 the thread will create a new Dir Access Client Profile object and add it to the connection profile set. After all the Com_InformedControl_Identity_DirectoryClientProfile instances have been traversed, the thread will continue processing at step 706.

Figure 9A:
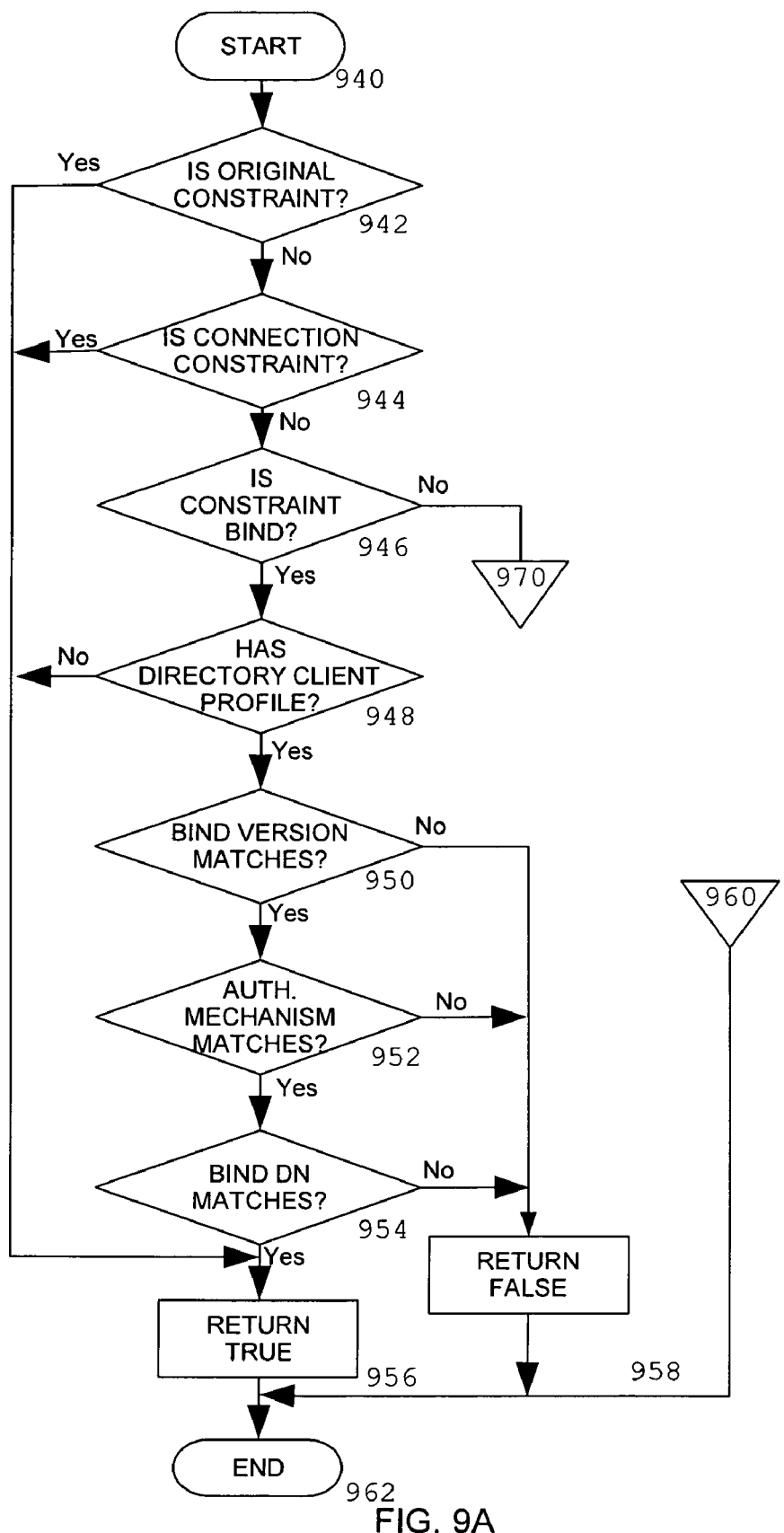
FIG. 9A and FIG. 9B are a flowchart illustrating the "constraint test" subroutine of the analysis server component.
Figure 9B:
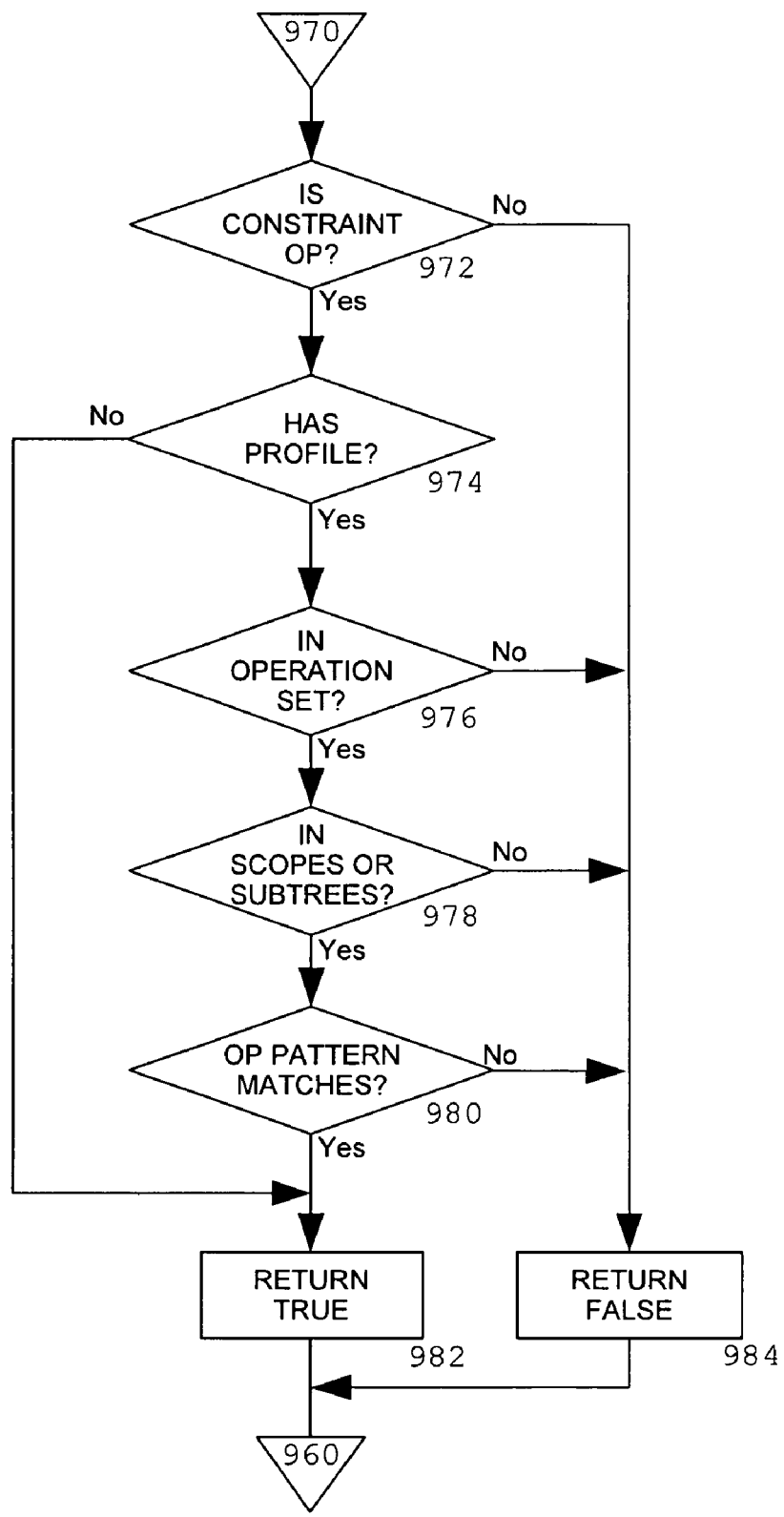

The behavior of a thread in the "constraint test" subroutine is illustrated by the flowchart of FIG. 9A and FIG. 9B. The input to this subroutine is a constraint object (306) and a dir access client profile object (318).

At step 942, the thread will test whether the constraint object is same object as the original constraint object set in the dir access client profile object when it was created, and if it is the same, then the thread will return true. At step 944, the thread will test whether the constraint object is an access constraint conn object (328), and if it is, then the thread will return true. At step 946, the thread will test whether the constraint object is a dir constraint bind object (330), and if it is not, then the thread will continue processing at step 972. At step 948, the thread will test whether the dir access client profile object has an association to an instance of Com_InformedControl_Identity_DirectoryClientProfile, and if it does not, then the thread will return true. At step 950, the thread will test whether the Version field of the dir constraint bind object matches the LdapBindVersion property of the Com_InformedControl_Identity_DirectoryClientProfile instance, and if they do not, then the thread will return false. At step 952, the thread will test whether the Mech field of the dir constraint bind object matches the AuthenticationMechanism property of the Com_InformedControl_Identity_DirectoryClientProfile instance, and if it does not, then the thread will return false. At step 954, the thread will test whether the Dn field of the dir constraint bind object matches the BindDn property of the Com_InformedControl_Identity_DirectoryClientProfile instance, and if it does not, then the thread will return false. At step 956, the thread will return true.

At step 972, the thread will test whether the constraint object is a dir constraint op object (332), and if it is not, then at step 984 the thread will return false. At step 974, the thread will test whether the dir access client profile object has an association to an instance of Com_InformedControl_Identity_DirectoryClientProfile, and if it does not, then the thread will return true. At step 976, the thread will test whether the Tag field of the dir constraint op object is present in the set specified in the LdapOperationsInvoked property of the Com_InformedControl_Identity_DirectoryClientProfile instance, and if it does not, then the thread will return false. At step 978, the thread will test whether the distinguished name of the Dn field of the dir constraint op object, if present, is within the scope of either one of the distinguished name values of the SubtreeScopes property of the Com_InformedControl_Identity_DirectoryClientProfile instance or one of the Com_InformedControl_Identity_DirectorySubtree instances associated to that Com_InformedControl_Identity_DirectoryClientProfile instance, and if it is not, then the thread will return false. At step 980, the thread will test whether the sequence of operations on the connection associated to that constraint object is within the scope of one or more of the values of the LdapOperationPatterns property of the Com_InformedControl_Identity_DirectoryClientProfile instance, and if it is not, then the thread will return false. At step 982, the thread will return true.

Figure 10:
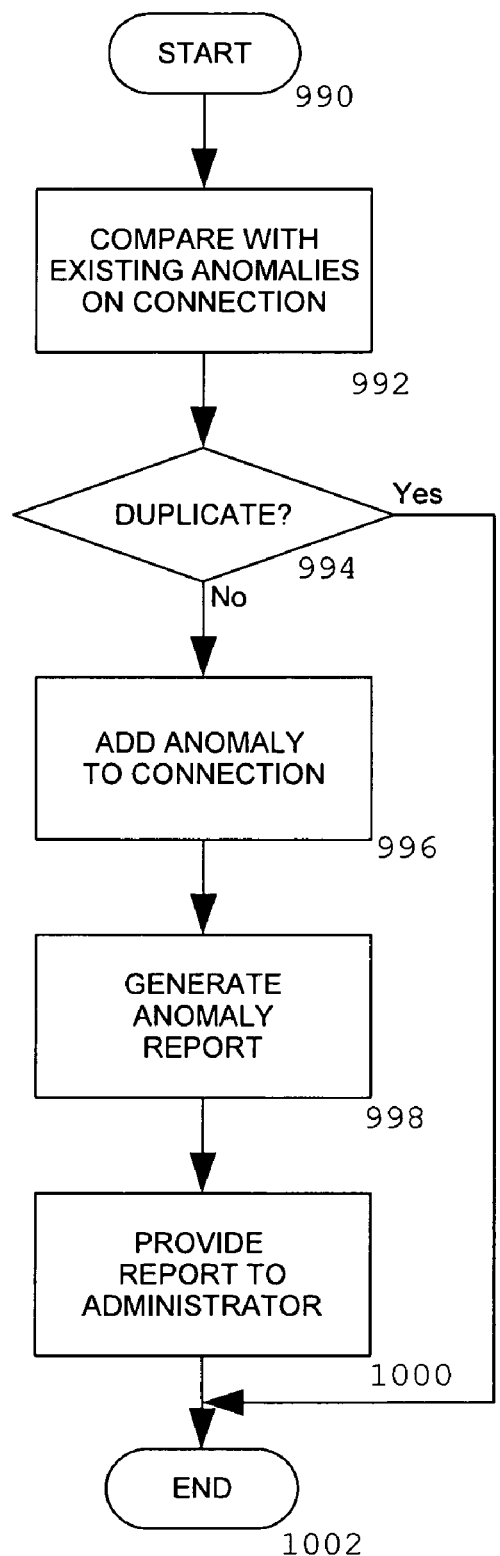
FIG. 10 is a flowchart illustrating the "anomaly handling" subroutine of the analysis server component.

The behavior of a thread in the "report anomaly" subroutine is illustrated by the flowchart of FIG. 10. The input to this subroutine is an anomaly object (310) and a connection object (308).

At step 992, the thread will compare the anomaly object to each of the existing anomaly objects associated with the connection object. If the anomaly object is a duplicate of an existing anomaly object associated with the connection object, then the thread will return. Otherwise, at step 996, the thread will associate the anomaly object to the connection object. At step 998, the thread will generate an anomaly report for the set of anomalies associated to the connection object. At step 1000, the thread will provide that report to the administrator via the console. At step 1002, the thread will return.

Figure 11:
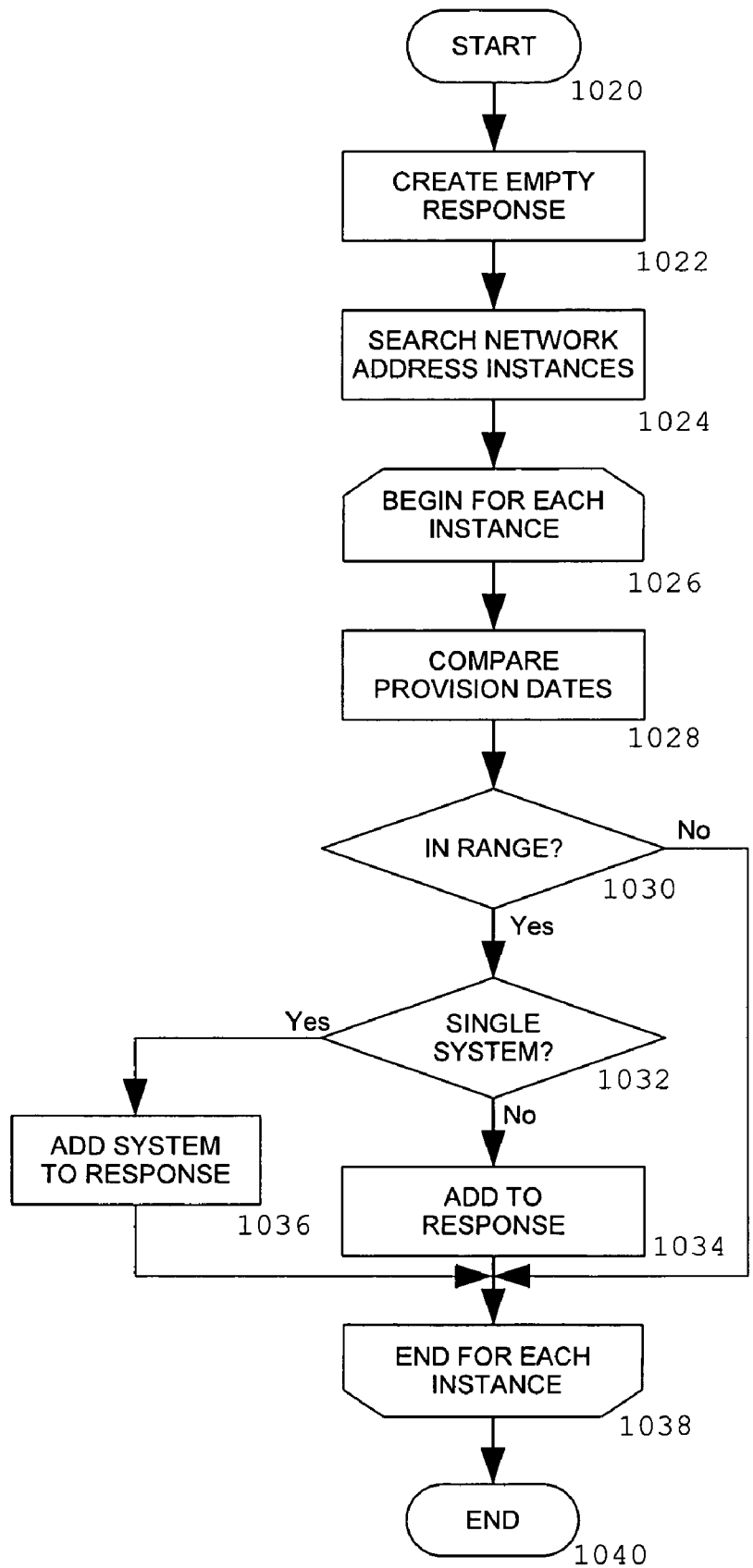
FIG. 11 is a flowchart illustrating the "network locate" subroutine of the analysis server component.

The behavior of a thread in the "network locate" subroutine is illustrated by the flowchart of FIG. 11. The input to this subroutine is the date of a connection attempt from a log record, and the source IP address of the directory client.

At step 1022, the thread will create an empty subroutine response object. At step 1024, the thread will search the database for instances of the class Com_InformedControl_General_NetworkAddress in which the value of the IPv4Address or IPv6Address property (depending on the version of the source IP address) matches the source IP address. At step 1026, the thread will iterate through that set of instances. At step 1028, the thread will compare the ProvisionStartDate and ProvisionEndDate properties of the instance with the date of the connection attempt. If the date is not in range, then the instance will be skipped. If the instance has an association to exactly one instance of the data model class Com_InformedControl_General_NetworkInterface, and that instance has exactly one association to the instance of the data model class Com_InformedControl_General_NetworkAddress and exactly one association to an instance of the class Org_Dmtf_Cim_System, then at step 1036 the instance of the data model class Org_Dmtf_Cim_System will be added to the response. Otherwise, at step 1034 the instance of the data model class Com_InformedControl_General_NetworkAddress will be added to the response.

CONCLUSIONS

Many different embodiments of this invention may be constructed without departing from the scope of this invention. While this invention is described with reference to various implementations and exploitations, and in particular with respect to systems for anomalous directory client activity detection in computer networks, it will be understood that these embodiments are illustrative and that the scope of the invention is not limited to them.

What is claimed is:

1. A method for reporting on an anomalous request received by a server sent from a second client on a network, said method comprising
 (a) sending a training request from a first client to said server,
 (b) including a first record in a log of said server wherein said first record comprises a first identity of said first client, and including a second record corresponding to said training request in said log of said server subsequent to said first record wherein said second record comprises a first indication generated by said server of a first result of processing said training request, (c) sending said log incorporating said first record and said second record from said server to an analysis server, (d) parsing said log incorporating said first record and said second record at said analysis server to a first pattern derived from said log wherein said parsing comprises determining said first pattern comprising a first sequence of a first operation type obtained from said first record followed by a second operation type obtained from said second record and further comprising a first parameter corresponding to said training request and said first identity of said first client, (e) storing in a database of said analysis server said first pattern and said first parameter derived from said log wherein storing said first parameter comprises storing in said database an identity field corresponding to said first identity of said first client, (f) sending said anomalous request from said second client to said server, (g) including a third record corresponding to said anomalous request in said log of said server wherein said third record comprises a second identity of said second client and including a fourth record corresponding to said anomalous request in said log of said server subsequent to said third record wherein said fourth record comprises a second indication generated by said server of a second result of processing said anomalous request, (h) sending said log incorporating said third record and said fourth record from said server to said analysis server, (i) parsing said log incorporating said third record and said fourth record at said analysis server to a second pattern derived from said log wherein said parsing comprises determining said second pattern comprising a second sequence of a third operation type obtained from said third record followed by a fourth operation type obtained from said fourth record and further comprising a first constraint object corresponding to said second identity of said second client obtained from said third record and a second constraint object corresponding to said anomalous request obtained from said fourth record, (j) comparing said second pattern with said first pattern as stored in said database wherein said comparing comprises determining whether said first sequence has operation types in a matching order as said second sequence, whether said first identity is matched by said first constraint object and whether said first pattern comprising said first parameter is matched by said second constraint object, (k) generating a report comprising said second constraint object, and (l) displaying said report to an administrator.

2. The method of claim 1, wherein said sending of said anomalous request from said second client to said server comprises transmitting said anomalous request in a network connection from said second client to said server encoded in a lightweight directory access protocol, said including of said third record corresponding to said anomalous request in said log of said server comprises including a distinguished name of said second client which was encoded in said lightweight directory access protocol as said second identity of said second client, and said parsing of said log incorporating said third record and said fourth record comprises determining said second pattern comprising said second sequence of said third operation type obtained from said third record followed by said fourth operation type obtained from said fourth record in which said third operation type is comprised in an authentication request from said client encoded in said lightweight directory access protocol and said fourth operation type is comprised in said anomalous request encoded in said lightweight directory access protocol.

3. A system for reporting on an anomalous request received by a server sent from a second client on a network, said system comprising (a) a first client,
(b) said server,
(c) an analysis server,
(d) a database,
(e) an administrator,
(f) said second client, wherein said first client sends a training request to said server, said server includes a first record in a log wherein said first record comprises a first identity of said first client, said server includes a second record corresponding to said training request in said log subsequent to said first record wherein said second record comprises a first indication generated by said server of a first result of processing said training request, said server sends said log incorporating said first record and said second record to said analysis server, said analysis server parses said log incorporating said first record and said second record, said analysis server extracts from said log a first pattern derived from said log wherein said first pattern comprises a first sequence of a first operation type obtained from said first record followed by a second operation type obtained from said second record and further comprising a first parameter corresponding to said training request and said first identity of said first client, said analysis server stores in said database said first pattern and first parameter derived from said log wherein said analysis server stores an identity field corresponding to said first identity of said first client, said second client sends said anomalous request to said server, said server includes a third record in said log wherein said third record comprises a second identity of said second client, said server includes a fourth record corresponding to said anomalous request in said log subsequent to said third record wherein said fourth record comprises a second indication generated by said server of a second result of processing said anomalous request said server sends said log incorporating said third record and said fourth record to said analysis server, said analysis server parses said log incorporating said third record and said fourth record, said analysis server extracts a second pattern from said log wherein said second pattern comprises a second sequence comprising a third operation type obtained from said third record followed by a fourth operation type obtained from said fourth record, and said second pattern further comprises a first constraint object corresponding to second identity of said second client obtained from said third record and a second constraint object corresponding to said anomalous request obtained from said fourth record, said analysis server compares said second pattern with said first pattern as stored in said database by determining whether said first sequence has operation types in a matching order as said second sequence, said first identity is matched by said first constraint object and whether said first pattern comprises said first sequence comprising said first parameter is matched by said second constraint object, said analysis server generates a report comprising said second constraint object, and said analysis server displays said report to said administrator.

4. A computer program product stored in a random access memory device with software for reporting on an anomalous request received by a server sent from a second client on a network, said computer program product comprising (a) instructions for sending a training request from a first client to said server, (b) instructions for including a first record in a log of said server wherein said first record comprises a first identity of said first client, and instructions for including a second record corresponding to said training request in said log of said server subsequent to said first record wherein said second record comprises a first indication generated by said server of a first result of processing said training request, (c) instructions for sending said log incorporating said first record and said second record from said server to an analysis server, (d) instructions for parsing said log incorporating said first record and said second record at said analysis server to a first pattern derived from said log wherein said parsing comprises determining said first pattern comprising a first sequence of a first operation type obtained from said first record followed by a second operation type obtained from said second record and further comprising a first parameter corresponding to said training request and said first identity of said first client, (e) instructions for storing in a database of said analysis server said first pattern derived from said log wherein storing said first pattern comprises storing in said database an identity field corresponding to said first identity of said first client, (f) instructions for sending said anomalous request from said second client to said server, (g) instructions for including a third record corresponding to said anomalous request in said log of said server wherein said third record comprises a second identity of said second client and including a fourth record corresponding to said anomalous request in said log of said server subsequent to said third record wherein said fourth record comprises a second indication generated by said server of a second result of processing said anomalous request, (h) instructions for sending said log incorporating said third record and said fourth record from said server to said analysis server, (i) instructions for parsing said log incorporating said third record and said fourth record at said analysis server to a second pattern derived from said log wherein said parsing comprises determining said second pattern comprising a second sequence of a third operation type obtained from said third record followed by a fourth operation type obtained from said fourth record and further comprising a first constraint object corresponding to said second identity of said second client obtained from said third record and a second constraint object corresponding to said anomalous request obtained from said fourth record, (j) instructions for comparing said second pattern with said first pattern as stored in said database wherein said comparing comprises determining whether said first sequence has operation types in a matching order as said second sequence, whether said first identity is matched by said first constraint object and whether said first pattern comprising said first parameter is matched by said second constraint object, (k) instructions for generating a report comprising said second constraint object, and (l) instructions for displaying said report to an administrator.

* * * * *